United States Patent [19]

Miller et al.

[11] Patent Number: 4,760,517

[45] Date of Patent: Jul. 26, 1988

[54] THIRTY-TWO BIT, BIT SLICE PROCESSOR

[75] Inventors: Michael J. Miller, San Jose; Danh Le Ngoc, Saratoga; John R. Mick, Los Altos Hills, all of Calif.

[73] Assignee: Integrated Device Technology, Inc., Santa Clara, Calif.

[21] Appl. No.: 920,716

[22] Filed: Oct. 17, 1986

[51] Int. Cl.⁴ .............................................. G06F 9/00
[52] U.S. Cl. ................................... 364/200; 364/900; 364/736
[58] Field of Search ... 364/200 MS File, 900 MS File, 364/736, 490

[56] References Cited

U.S. PATENT DOCUMENTS

| | | | |
|---|---|---|---|
| 4,393,468 | 7/1983 | New | 364/736 |
| 4,467,444 | 8/1984 | Harmon, Jr. et al. | 364/900 |
| 4,641,247 | 2/1987 | Laugesen et al. | 364/490 |

Primary Examiner—Gareth D. Shaw
Assistant Examiner—A. Ruiz
Attorney, Agent, or Firm—Thomas E. Schatzel

[57] ABSTRACT

The combination of a seven-port random access memory (RAM) unit, a funnel shifter, a mask generator, an arithmetic logic unit (ALU), a merge logic unit, a number of multiplexers, and three bi-directional data buses are configured to form a thirty-two bit, cascadable, microprogrammable, bit-slice suitable for executing complex operations such as those which require that several operands be read from the memory unit, be rotated in the funnel shifter, be operated upon by the arithmetic logic unit, be merged in the merge logic unit, and the result be written back into the memory unit all in a single cycle.

8 Claims, 1 Drawing Sheet

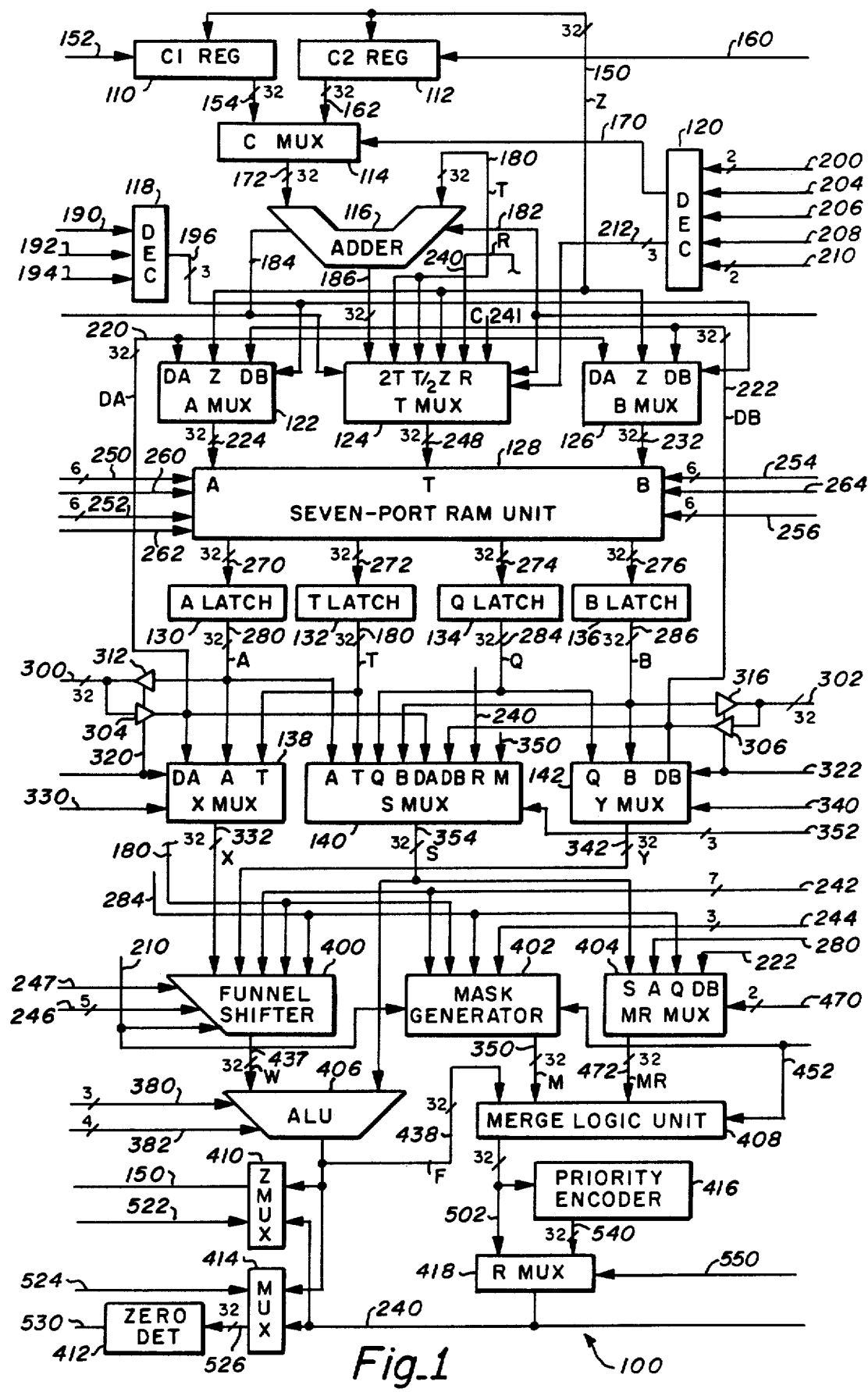
Fig._1

THIRTY-TWO BIT, BIT SLICE PROCESSOR

BACKGROUND OF THE INVENTION

1. Field of the Invention

The present invention relates to integrated circuit type microprocessors generally and more particularly to a thirty-two bit, cascadable, microprogrammable, bit-slice.

2. Description of the Prior Art

A bit-slice is a multi-device microprocessor in which the control portion (which is also referred to as an address controller, a microprogram sequencer, or a state machine) is contained on one device, and one or more identical arithmetic and logic unit (ALU) portions and register file portions are contained on separate (cascadable) devices called slices.

The state of the prior art has progressed from four-bit slices of the type which are commonly designated 74181 (a chip manufactured by Texas Instruments including only an arithmetic logic unit), to four-bit slices of the type which are commonly designated 2901 (a chip manufactured by Advanced Micro Devices including an arithmetic logic unit and register file), to sixteen-bit slices of the type which are commonly designated 29116 (a non-cascadable chip manufactured by Advanced Micro Devices).

A sixteen-bit slice typical of the state of the prior art is disclosed in the U.S. Pat. No. 4,467,444 which issued to Harmon, Jr. et al. Included is an arithmetic logic unit (which is designated 62 in the above mentioned patent), a two-port thirty-two word by sixteen-bit random access memory (RAM) unit (48), and a barrel shifter (64).

Although useful, the above mentioned slices are disadvantageous in that a relatively large number of devices are required to perform a number of operations. Additionally, the above mentioned slices are disadvantageous in that a relatively long period of time (a relatively large number of clocking signal cycles) are required to perform a number of operations. For example, for use with a data base having packed data, a need exists for a means of selecting a field in a word of data and of operating upon the field in one cycle. Further, for use with a frame buffer of a (video) graphics display, a need exists for a means of doing a bit-block move (bit block) in one cycle. In otherwords of extracting a group of bits representing pixels of a display region (not necessarily on modulo-thirty-two bit boundaries), normalizing it, rotating it into place, and merging it into a destination region of the display in one cycle.

SUMMARY OF THE PRESENT INVENTION

It is therefore the primary object of the present invention to provide a means of doing complex operations in one cycle.

Another object of the present invention is to provide a means of doing complex operations with a relative small number of devices.

Briefly, the presently preferred embodiment of the present invention includes a seven-port random access memory (RAM) unit, a funnel shifter, a mask generator, an arithmetic logic unit (ALU), and a merge logic unit.

The ability to provide a means of doing complex operations in one cycle is the principal advantage of the present invention.

Another advantage of the present invention is the ability it affords to provide a means of doing complex operations with a relative small number of devices.

These and other objects and advantages of the present invention will no doubt be obvious to those skilled in the art after having read the following detailed description of the presently preferred embodiment which is illustrated in the FIGURE of the drawing.

IN THE DRAWING

FIG. 1 is a schematic diagram of the presently preferred embodiment in accordance with the present invention of a thirty-two bit, cascadable, microprogrammable, bit-slice.

DETAILED DESCRIPTION OF THE PREFERRED EMBODIMENT

In accordance with the present invention illustrated in FIG. 1 of the drawing generally designated by the number 100 is the presently preferred embodiment of a thirty-two bit, cascadable, microprogrammable, bit-slice. Bit-slice 100 is shown to include a thirty-two bit (C1) register (REG), which is designated 110; a thirty-two bit (C2) register (REG), which is designated 112; a (C) multiplexer (MUX), which is designated 114; an adder, which is designated 116; a pair of decoders (DEC), which are respectively designated 118 and 120; an (A) multiplexer (MUX), designated 122; a (T) multiplexer (MUX) 124; a (B) multiplexers (MUX) 126; a seven-port random access memory (RAM) unit (register file) 128; an (A) latch 130; a (T) latch 132; a (Q) latch 134; a (B) latch 136; an (X) multiplexer (MUX) 138; an (S) multiplexer (MUX) 140; and a (Y) multiplexer (MUX) 142.

(C1) register 110 has a set of thirty-two data inputs, each of which is connected to a respective line of a thirty-two line (Z) bus designated 150. Further, (C1) register 110 has a clock input, which is connected to receive a system clocking signal (that, for clarity, is not shown); an enable input, which is connected to a line 152; and a set of thirty-two data outputs, each of which is connected to a respective line of a thirty-two line bus 154. (C1) register 110 is of the type which is suitable for storing a constant. More specifically, (C1) register 110 receives thirty-two signals each of which is developed on a respective one of the thirty-two lines of (Z) bus 150. (C1) register 110 is responsive to the system clocking signal in conjunction with an enabling signal developed on line 152 and operative to store the current state of the thirty-two (Z) bus 150 signals. Further, register 110 develops on the thirty-two lines of bus 154 signals of the states of which correspond each to a respective one of the stored states.

(C2) register 112, which is similar to (C1) register 110, is configured with the set of thirty-two data inputs also each connected to a respective line of the thirty-two lines of (Z) bus 150, with the enable input connected to a line 160, and with the set of thirty-two data outputs each connected to a respective line of a thirty-two line bus 162. (C2) register 112 is also of the type which is suitable for storing a constant.

(C) multiplexer 114 has a set of thirty-two data inputs, each of which is connected to a respective line of the thirty-two lines of bus 154; another set of thirty-two data inputs, each of which is connected to a respective line of the thirty-two lines of bus 162; a control (select) input, which is connected to a line 170; and a set of thirty-two data outputs, each of which is connected to a respective line of a thirty-two line bus 172. (C) multiplexer 114 is of the type which develops a signal on each of the thirty-two lines of bus 172. The state of the bus 172 signals corresponds either each to the state of a respective one of the thirty-two bus 154 signals or each to the state of a respective one of the thirty-two bus 162 signals as determined (selected) by the state of a controlling signal developed on line 170.

Adder 116 has a set of thirty-two data (first addend) inputs, each of which is connected to a respective line of the thirty-two lines of bus 172; another set of thirty-two data (second addend) inputs, each of which is connected to a respective line of a thirty-two line (T) bus 180; a carry input, which is connected to a (T0) line 182; a carry output, which is connected to a (T31) line 184; and a set of thirty-two data (sum) outputs, each of which is connected to a respective line of a thirty-two line bus 186. Adder 116 is of the type which develops on the thirty-two lines of bus 186 signals the state of which represents the binary sum of the number represented by the state of the signals developed on the thirty-two lines of bus 172 (first addend) plus the number represented by the state of the signals developed on the thirty-two lines of (T) bus 180 (second addend) plus a number represented by the state of a carry signal externally developed on (T0) line 182. Further, adder 116 develops on (T31) line 184 a signal the state of which indicates whether a carry results from the addition. In other words, when signals representing an address are successively developed on (T) bus 180 (by seven-port RAM unit 128, as will become apparent shortly) adder 116 successively increments the address by a constant represented by the signals developed either by (C1) register 110 on bus 154 or by (C2) register 112 on bus 162.

Decoder 118 has three inputs connected, one to a line 190 to receive an externally generated A/Z bus selecting signal, another to a line 192 to receive an externally generated B/Z bus selecting signal, and the other one to a line 194 to receive an externally generated A-B bus exchanging signal. Additionally, decoder 118 has three outputs, each of which is connected to a respective line of a three line bus 196. Responsive to the signals externally generated on lines 190, 192, and 194, decoder 118 develops on the three lines of bus 196 signals for controlling multiplexers 122 and 126, as will become apparent shortly.

Decoder 120 has a pair of inputs, each of which is connected to a respective line of a two line bus 200 to receive externally generated T-bus selecting signals. Further, decoder 120 has three additional inputs, each of which is connected to a respective one of three lines that are designated 204, 206, and 208 to receive a respective one of four externally generated signals that include a multiply selecting signal, a divide selecting signal, and a load T selecting signal. Additionally, decoder 120 has a pair of inputs, each of which is connected to a respective line of a two line bus 210 to receive slice number designating signals. Finally, decoder 120 has an output, which is connected to line 170 upon which the decoder develops the (C) multiplexer 114 controlling signal, and three outputs, each of which is connected to a respective line of a three line bus 212 upon which the decoder develops signals for controlling multiplexer 124, as will become apparent shortly.

(A) multiplexer 122 has a first set of thirty-two data inputs, each of which is connected to a respective line of a thirty-two line (DA) bus 220; a second set of thirty-two data inputs, each of which is connected to a respective line of a thirty-two line (DB) bus 222; and a third set of thirty-two data inputs, each of which is connected to the respective line of the thirty-two lines of (Z) bus 150. Additionally, (A) multiplexer 122 has a pair of control (select) inputs, each of which is connected to one of the lines of the two lines of bus 196, and a set of thirty-two data outputs, each of which is connected to a respective line of a thirty-two line bus 224. (A) multiplexer 122 is of the type which develops on each of the thirty-two lines of bus 224 signals the state of which correspond either each to the state of a respective one of the thirty-two (DA) bus 220 signals, each to the state of the respective one of the thirty-two (DB) bus 222 signals, or each to the state of the respective one of the thirty-two (Z) bus 150 signals as determined (selected) by the state of the controlling signals developed on the three lines of bus 196.

Skipping for a moment, (B) multiplexer 126 is similar to (A) multiplexer 122. Like (A) multiplexer 122, the three sets of data inputs of (B) multiplexer 126 are connected, each to a respective one of the three buses 220, 150, and 222; and, the pair of control (select) inputs of the multiplexer are connected to two of the lines of bus 196. The set of thirty-two data outputs of (A) multiplexer 126 are connected, each to a respective line of a thirty-two line bus 232.

The following truth (function) table illustrates the logical states of decoder 118 and multiplexers 122 and 126.

| Signal State | | | Bus Selected | |
|---|---|---|---|---|
| Line 194 | Line 190 | Line 192 | Multiplexer 122 | Multiplexer 126 |
| 0 | 0 | 0 | (DA) Bus 220 | (Z) Bus 150 |
| 0 | 0 | 1 | (DA) Bus 220 | (DB) Bus 222 |
| 0 | 1 | 0 | (Z) Bus 150 | (Z) Bus 150 |
| 0 | 1 | 1 | (Z) Bus 150 | (DB) Bus 222 |
| 1 | x | x | (DB) Bus 222 | (DA) Bus 220. |

In otherwords, when the A-B bus exchanging signal externally generated on line 194, the A/Z bus selecting signal externally generated on line 190, and the B/Z bus selecting signal externally generated on line 192 all have a low logic level (0), (A) multiplexer 122 selects (DA) bus 220; and, (B) multiplexer 126 selects (Z) bus 150. When the B/Z bus selecting signal externally generated on line 192 has a high logic level (1) and other signals have a low logic level, (A) multiplexer 122 selects (Z) bus 150; and, (B) multiplexer 126 selects (DB) bus 222, finally, when the A-B bus exchaning signal externally generated on line 194 has a high logic level, irrespective of the state of the other signals, (A) multiplexer 122 selects (DB) bus 222; and, (B) multiplexer 126 selects (DA) bus 220.

(T) multiplexer 124 has six sets of thirty-two data inputs. The first set of thirty-two (T) multiplexer 124 data inputs are connected, each to the respective line of the thirty-two lines of bus 186. The second set of thirty-two (T) multiplexer 124 data inputs (2T) are connected, each to the next higher order line of (T) bus 180. In otherwords, the lowest order data input of the second set of (T) multiplexer 124 data inputs is connected to the second lowest order line of (T) bus 180; the second lowest order data input is connected to the third lowest order line; and, so on. The highest order data input of the second set of (T) multiplexer 124 data inputs is connected to (T31) line 184. The third set of thirty-two (T) multiplexer 124 data inputs (T/2) are connected, each to the next lower order line of (T) bus 180. In otherwords, the highest order data input of the third set of (T) multiplexer 124 data inputs is connected to the second highest order line of (T) bus 180; the second highest order data input is connected to the third highest order line; and, so on. The lowest order data input of the third set of (T) multiplexer 124 data inputs is connected to (T0) line 182. The fourth set of thirty-two (T) multiplexer 124 data inputs are connected, each to the respective line of the thirty-two lines of (Z) bus 150. Each of the thirty-two (T) multiplexer 124 data inputs of the fifth set of data inputs is connected to a respective line of a thirty-two line (R) bus 240. Finally, the sixth set of thirty-two (T) multiplexer 124 data inputs are connected, each to the respective line of an (immediate) bus 241 formed by combining four other buses. Combined are the lines of a seven line (SP) bus 242 (lowest order data inputs), the lines of a three line (W) bus 244 (next lowest order data inputs), the two lines of bus 200, the lines of a five line bus 246, and a line 247 (highest order data input).

Additionally, (T) multiplexer 124 has a set of three control (select) inputs, which are connected, each to the respective line of the three lines of bus 212, and a set of thirty-two data outputs, which are connected, each to a respective line of a thirty-two line bus 248. (T) multiplexer 124 is of the type which develops a signal on each of the thirty-two lines of bus 248 the state of which correspond each to the state of a respective one of the thirty-two signals developed on the selected bus. The logical states of decoder 120 and (T) multiplexer 124 are illustrated by the following truth table:

| Signal State On Line | | | | | | |
|---|---|---|---|---|---|---|
| 200 (1) | 200 (2) | 204 | 206 | 208 | Bus Selected | Comment |
| 0 | 0 | 0 | 0 | 0 | 150 | (Z) bus |
| 1 | 0 | 0 | 0 | 0 | 240 | (R) bus |
| 0 | 1 | 0 | 0 | 0 | 186 | T plus (C1) register 110 |
| 1 | 1 | 0 | 0 | 0 | 186 | T plus (C2) register 112 |
| x | x | 0 | 0 | 1 | Combined | Load immediate data |
| x | x | 0 | 1 | 0 | 180 | Shift up T |
| x | x | 1 | 0 | 0 | 180 | Shift down T. |

Seven-port random access memory (RAM) unit (register file) 128 has three sets of thirty-two data inputs. The first set of thirty-two data inputs (AIN) are each connected to the respective line of the thirty-two lines of bus 224; the second set of thirty-two data inputs (TIN) are each connected to the respective line of the thirty-two lines of bus 248; and, the third set of thirty-two data inputs (BIN) are each connected to a respective line of the thirty-two lines of bus 232. In addition, seven-port random access memory unit 128 has four sets of six address inputs (AddrA, AddrT, AddrB, and AddrQ). Each of the the address inputs are connected, the first set (AddrA) to a respective line of a six line bus 250, the second set (AddrT) to a respective line of another six line bus 252, the third set (AddrB) to a respective line of another six line bus 254, and the fourth set (AddrQ) to a respective line of still another six line bus 256.

Additionally, seven-port random access memory (RAM) unit 128 has three write enable inputs which are connected, the first (/WEA) to a line 260, the second (/WET) to a line 262, and the third (/WEB) to a line 264. Further, unit 128 has a clock input, which is connected to receive the system clocking signal (that, for clarity, is not shown). Finally, unit 128 has four sets of thirty-two data outputs (AOUT, TOUT, QOUT, and BOUT). Each of the data outputs are connected, the first set (AOUT) each to a respective line of a thirty-two line bus 270, the second set (TOUT) each to a respective line of another thirty-two line bus 272, the third set (QOUT) each to a respective line of another thirty-two line bus 274, and the fourth set (BOUT) to a respective line of still another thirty-two line bus 276.

Employed in seven-port random access memory (RAM) unit 128 (but not shown) are memory cells arranged as sixty-four words each of thirty-two bits (cells). Also employed in unit 128 are four address decoders (A, T, B, and Q) each connected to receive the addressing signals developed at the respective set of address inputs. The address decoders are each of the type which is responsive to the respective addressing signal and operative to develop selecting all thirty-two cells (bits) of the designated word. In addition, unit 128 employs four, thirty-two line, internal buses (A, T, B, and Q). Further, unit 128 employs bus drivers configured to couple the various signals developed on the lines connected to the three sets of data inputs (AIN connected to bus 224, TIN connected to bus 248, and BIN connected to bus 252) each to the respective one of the lines of the respective one of the three internal buses (A, T, and B), when the system clocking signal has a low logic level and when a low logic level enabling signal is developed at the respective write enable input (/WEA connected to line 260, /WET connected to line 262, and /WEB connected to line 264).

Still further, seven-port random access memory (RAM) unit 128 employs sense amplifiers configured to develop from each of the the various signals developed on the four internal buses (A, T, B, and Q) a signal for driving the respective one of the lines connected to the respective one of the four sets of data outputs (AOUT connected to bus 270, TOUT connected to bus 272, QOUT connected to bus 274, and BOUT connected to bus 276. Finally, as previously indicated, unit 128 employs cells comprising sixty-four words by thirty-two bis (cells). Each cell contains a first and a second cross coupled inverter. In other words, the input of the first inverter is connected to the output of the second inverter, the input of which is connected to the output of the first inverter. Additionally, each cell contains four transistors each of the channels of which is connected to selectively couple signals between the output of the first inverter and the respective line of the respective one of the four internal buses (A, T, B, and Q). The gate of each of the transistors is connected to receive the respective one of the thirty-two selecting signals developed by the respective one of the four address decoders (A, T, B, and Q).

Under control of the A/Z B/Z and A-B signals externally generated on lines 190, 192, and 194, data represented by the signals developed on the thirty-two lines of (DA) bus 220, (Z) bus 150, or (DB) bus 222 can be written into any two, seven-port random access memory (RAM) unit 128 word locations whose addresses are specified by the addressing signals externally developed on the six lines of bus 250 (AddrA) and the six lines of bus 254 (AddrB) when the system clocking signal, the write enabling signal, (/WEA) externally generated on line 260, and the write enabling signal, (/WEB) externally generated on line 264, all have a low logic level. Additionally, data represented by the signals developed on the thirty-two lines of bus 186, (T) bus 180, (Z) bus 150, or (R) bus 240 can be written into any unit 128 word location whose address is specified by the addressing signals externally generated on the six lines of bus 252 (AddrT) when the system clocking signal and the write enabling signal, (/WET) externally generated on line 262, both have a low logic level. (Under control of a special instruction (load T, immediate), a sixteen-bit word of data in the immediate data field, which is represented by the state of signals externally developed on (T) bus 180 can be loaded directly into the unit 128 word location specified by the addressing signals externally generated on bus 252 (AddrT). During the execution of special instructions (multiply or divide), the word of data stored in the word location specified by the bus 252 (AddrT) signals can be shifted up or down.)

Any four, seven-port random access memory (RAM) unit 128 word locations whose addresses are specified by the addressing signals externally developed on the six lines of bus 250 (AddrA), the six lines of bus 252 (AddrT), the six lines of bus 254 (AddrB), and the six lines of bus 256 (AddrQ) can be read simultaneously. (Identical data appears at the four sets of data outputs when the same address appears at the four sets of address inputs.) Latches 130, 132, 134, and 136 hold the data, when the state of the system clocking signal is low. (When the state of the system clocking signal is high, the latches are transparent.)

(A) latch 130, (T) latch 132, (Q) latch 134, and (B) latch 136 each have a set of thirty-two data inputs, each of which is connected to the respective line of the respective one of the thirty-two line buses, 270, 272, 274, and 276. Further, the latches (130, 132, 134, and 136) each have a clock input, which is connected to receive the system clocking signal (that, for clarity, is not shown). Finally, the latches each have a set of thirty-two data outputs, each of which is connected to a respective line of a respective one of four thirty-two line buses, (A) latch 130 to an (A) bus 280, (T) latch 132 to (T) bus 180, (Q) latch 134 to a (Q) bus 284, and (B) latch 136 to a (B) bus 286.

The latches (130, 132, 134, and 136) are each of the type which receive thirty-two signals each developed on a respective one of the thirty-two lines of the respective one of the four, thirty-two line buses 270, 272, 274, and 276 and which develop signals on each of the thirty-two lines of the respective one of the four, thirty-two line buses 280, 180, 284, 286. The state of the latch developed signals correspond each to the current state of the respective one of the received signals, when the logic level of the system clocking signal is high. When the state of the system clocking signal is low, the state of the latch developed signals correspond each to the state the respective one of the received signals had just before the level of the system clocking signal went low.

Thirty-two bit, bit-slice 100 is connected to a pair of external, thirty-two line, bi-directional, data buses, respectively designated 300 (DA) and 302 (DB). Signals externally developed on the various lines of (DA) bus 300 are coupled each to the respective line of the thiry-two lines of (DA) bus 220 by thirty-two bus drivers represented by a buffer 304; and, signals externally developed on the various lines of (DB) bus 302 are coupled each to the respective line of the thirty-two lines of (DB) bus 222 by thirty-two additional bus drivers represented by another buffer 306. Signals developed on the various lines of a thirty-two line (A) bus 280 are coupled each to the respective line of (DA) bus 300 by thirty-two additional bus drivers represented by another buffer 312; and, signals developed on the various lines of another thirty-two line (B) bus 286 are coupled each to a respective line of (DB) bus 302 by thirty-two additional bus drivers represented by still another buffer 316. Buffers (bus drivers) 304 and 312 each employ an output enable input, which is coupled to a line 320 to receive an externally generated, output enabling signal (OEA); and buffers 306 and 316 also each employ an output enable input, which is coupled to a line 322 to receive another externally generated, output enabling signal (OEB).

(X) multiplexer 138 is similar to (A) multiplexer 122. The three sets of data inputs of (X) multiplexer 138 are connected, each to the respective one of the three buses 220, 280, and 180. The pair of control (select) inputs of (X) multiplexer 138 are connected, one to line 320 and the other to a line 330. The set of thirty-two data outputs of (X) multiplexer 138 are connected, each to a respective line of thirty-two line (X) bus 332.

Skipping for a moment, (Y) multiplexer 142 is also similar to (A) multiplexer 122. The three sets of data inputs of (Y) multiplexer 142 are connected, each to a respective one of the three buses 284, 286, and 222. The pair of control (select) inputs of (Y) multiplexer 142 are connected, one to line 322 and the other to a line 340. The set of thirty-two data outputs of (Y) multiplexer 142 are connected, each to a respective line of a thirty-two line (Y) bus 342.

(S) multiplexer 140 is of the type which has eight sets of thirty-two data inputs, which are connected, one set to (A) bus 280, another set to (T) bus 180, a third set to (Q) bus 284, a fourth set to (B) bus 286, a fifth set to (DA) bus 220, a sixth set to (DB) bus 222, a seventh set to (R) bus 240, and the last (eighth) set to a thirty-two line (M) bus 350. Additionally, (S) multiplexer 140 has three control (select) inputs, which are each connected to a respective line of a three line bus 352 to receive three externally generated control signals. Finally, (S) multiplexer 140 has a set of thirty-two data outputs, which are each connected to a respective line of a thirty-two line (S) bus 354.

Under control of the signals externally generated on lines 320 and 322 (OEA and OEB) and the signals externally generated on the three lines of bus 352, the signals developed on buses 280, 180, 284, 286, 220, 222, 240 or 350 can be selected for arithmetic logic unit (ALU) operations, funnel shifter operations, mask generator operations, merge logic operations, or read out onto the lines of (DA) bus 300 or (DB) bus 302, as will become apparent shortly.

Bit-slice 100 is shown to additionally include a funnel shifter 400, a mask generator 402, an (MR) multiplexer (MUX) 404, an arithmetic logic unit (ALU) 406, a merge logic unit 408, a (Z) multiplexer (MUX) 410, a zero detector 412, a multiplexer (MUX) 414, a priority encoder 416, and a multiplexer (MUX) 418. Funnel shifter 400 has a set of thirty-two data inputs, which are each connected to the respective line of the thirty-two lines of (X) bus 332 to receive signals representing a first (X) operand, and another set of thirty-two data inputs, which are each connected to the respective line of the thirty-two lines of (Y) bus 342 to receive signals representing a second (Y) operand. Additionally, funnel shifter 400 has an input, which is connected to line 247 to receive an externally generated Mlink signal which represents a fill number; a set of five inputs, which are each connected to a respective line of the five lines of bus 246 to receive externally generated funnel shifter 400 controlling signals; a set of two inputs, which are each connected to the respective line of the two lines of bus 210 to receive the slice number specifying signals; and a set of seven inputs, which are each connected to a respective line of the seven lines of (SP) bus 242 to receive externally generated signals designating a movable window (mask) start position. Further, funnel shifter 400 has a set of seven inputs, which are each connected to the respective lines of the seven lowest order lines of the thirty-two lines of (T) bus 180 to receive signals designating an alternative movable window start position. Finally, funnel shifter 400 has a set of thirty-two data outputs, which are each connected to a respective line of a thirty-two line (W) bus 437.

Employed in funnel shifter 400 (but not shown) is a start position multiplexer having a set of seven data inputs, which are each connected to the respective line of the seven lines of bus 242 to receive the start position indicating (SP) signals; another set of seven data inputs, which are each connected to the respective line of the seven lowest order lines of (T) bus 180; and a number of data outputs, which are each connected to a respective line of an SP bus. Additionally, funnel shifter 400 employs a funnel input control unit having a set of five control inputs, which are each connected to a respective line of the five lines of bus 246 to receive the funnel shifter 400 controlling signals; a set of two inputs, which are each connected to the respective one of the two lines of bus 210 to receive the slice number specifying signals; a number of inputs, which are each connected to the respective line of the SP bus; and a number of outputs, which are each connected to a respective line of a control bus. Further, funnel shifter 400 employs an FH multiplexer and an FL multiplexer each having a set of thirty-two data inputs, which are each connected to the respective line of the thirty-two lines of (X) bus 332; another set of thirty-two data inputs, which are each connected to the respective line of the thirty-two lines of (Y) bus 342; an input, which is connected to receive a signal representing the sign of X; an input, which is connected to receive a signal representing the sign of Y; an input, which is connected to line 247 to receive the Mlink signal; an input, which is connected to receive a low logic level (0) signal; a number of inputs, which are each connected to the respective line of the control bus; and a set of thirty-two data outputs. Finally, funnel shifter 400 employs thirty-two multiplexers each having thirty-two data inputs, which are each connected to the appropriate data output of the sixty-four data outputs of the FH and FL multiplexers; a number of control inputs, which are each connected to the respective line of the control bus; and a data output, which is connected to the appropriate line of the thirty-two lines of (W) bus 437.

Funnel shifter 400 operates on two thirty-two bit numbers (represented by the signals developed on (X) bus 332 and (Y) bus 342) and generates a thirty-two bit number (represented by signals the funnel shifter develops on (W) bus 437. Funnel shifter 400 performs all of the basic barrel-shift functions including shift up/down and rotate up/down N positions for thirty-two bit as well as sixty-four bit numbers in a single cycle. This high-speed shifting is very useful in operations such as the normalization of a mantissa for floating point arithmetic and in applications in which the packing and unpacking of data are frequent operations. In addition funnel shifter 400 can be used to extract a thirty-two bit output from a sliding window applied to sixty-four bit input. A seven-bit start position designated by the (SP) signals (0–6) developed on bus 242 is used to control a thirty-two bit sliding window (W) which operates upon a sixty-four bit word (FH, FL). A positive start position moves the sliding window toward the least significant bit, a negative start position (two's complement format) moves the sliding window toward the most significant bit. When the signals developed on (T) bus 180 and (Q) bus 284 are selected as inputs, the seven least significant bits of the (T) bus 180 signals are used to specify the start position and the least significant seven bits of the (Q) bus 284 signals are used to specify the width. The following funnel shifter 400 truth table illustrates the input selection.

Funnel Shifter 400 Truth Table

| Bus 246 Signal State | | | | | FH | FL | |
|---|---|---|---|---|---|---|---|
| 4 | 3 | 2 | 1 | 0 | | | |
| 0 | 0 | 0 | 0 | 0 | 0 | X | Shift X up/down and fill with 0 |
| 0 | 0 | 0 | 0 | 1 | 0 | Y | Shift Y up/down and fill with 0 |
| 0 | 0 | 0 | 1 | 0 | Mlink | X | Shift X up/down and fill with Mlink |
| 0 | 0 | 0 | 1 | 1 | Mlink | Y | Shift Y up/down and fill with Mlink |
| 0 | 0 | 1 | 0 | 0 | Y | X | Shift X up/down and fill with Y |
| 0 | 0 | 1 | 0 | 1 | X | Y | Shift Y up/down and fill with X |
| 0 | 0 | 1 | 1 | 0 | Sign X | X | Shift X arithmetically up and fill with 0 or down and sign extension |
| 0 | 0 | 1 | 1 | 1 | Sign Y | Y | Shift Y arithmetically up and fill with 0 or down and sign extension. |
| 0 | 1 | 0 | 0 | 0 | Sign/Mlink | X | Arithmetic up/down and fill with Mlink |
| 0 | 1 | 0 | 0 | 1 | Sign/Mlink | Y | Arithmetic up/down and fill with Mlink |
| 0 | 1 | 0 | 1 | 0 | X | X | Shift X up/down and fill with X |
| 0 | 1 | 0 | 1 | 1 | Y | Y | Shift Y up/down and fill with Y |
| 0 | 1 | 1 | 0 | 0 | | | Pass X |
| 0 | 1 | 1 | 0 | 1 | | | Pass Y |
| 0 | 1 | 1 | 1 | 0 | | | 00000000H |
| 0 | 1 | 1 | 1 | 1 | | | FFFFFFFFH |
| 0 | 0 | 0 | 0 | 0 | 0 | X | Shift X up/down, fill with 0, and pass ALU |
| 0 | 0 | 0 | 0 | 1 | 0 | Y | Shift Y up/down, fill with 0, and pass ALU |
| 0 | 0 | 0 | 1 | 0 | Mlink | X | Shift X up/down, fill with Mlink, and pass ALU |

-continued

| | | | | | | | | |
|---|---|---|---|---|---|---|---|---|
| 0 | 0 | 0 | 1 | 1 | Mlink | Y | Shift Y up/down, fill with Mlink, and pass ALU | |
| 0 | 0 | 1 | 0 | 0 | Y | X | Shift X up/down, fill with Y, and pass ALU | |
| 0 | 0 | 1 | 0 | 1 | X | Y | Shift Y up/down, fill with X, and pass ALU | |
| 0 | 0 | 1 | 1 | 0 | Sign X | X | Shift X arithmetically up and fill with 0 or down and sign extension and pass ALU | |
| 0 | 0 | 1 | 1 | 1 | Sign Y | Y | Shift Y arithmetically up and fill with 0 or down and sign extension and pass ALU | |
| 0 | 1 | 0 | 0 | 0 | Sign/Mlink | X | Arithmetic up/down, fill with Mlink, and pass ALU | |
| 0 | 1 | 0 | 0 | 1 | Sign/Mlink | Y | Arithmetic up/down, fill with Mlink, and pass ALU | |
| 0 | 1 | 0 | 1 | 0 | X | X | Rotate X and pass ALU | |
| 0 | 1 | 0 | 1 | 1 | Y | Y | Rotate Y and pass ALU | |
| 0 | 1 | 1 | 0 | 0 | | | Pass negated X | |
| 0 | 1 | 1 | 0 | 1 | | | Pass negated Y | |
| 0 | 1 | 1 | 1 | 0 | | | Pass X and fill bit 0-sp with C | |
| 0 | 1 | 1 | 1 | 1 | | | Pass Y and fill bit 0-sp with C | |

Funnel Shifter 400 Truth Table

| Bus 242 or Bus 180 | | | | | | | Position of the Sliding Window |
|---|---|---|---|---|---|---|---|
| Signal State | | | | | | | |
| 6 | 5 | 4 | 3 | 2 | 1 | 0 | |
| 0 | 0 | 0 | 0 | 0 | 0 | 0 | no shift |
| 0 | 0 | 0 | 0 | 0 | 0 | 1 | shift up 1 position |
| 0 | 0 | 0 | 0 | 0 | 1 | 0 | shift up 2 positions |
| 0 | 0 | 0 | 0 | 0 | 1 | 1 | shift up 3 positions |
| 0 | 0 | 0 | 0 | 1 | 0 | 0 | shift up 4 positions |
| 0 | 0 | 0 | 0 | 1 | 0 | 1 | shift up 5 positions |
| 0 | 0 | 0 | 0 | 1 | 1 | 0 | shift up 6 positions |
| 0 | 0 | 0 | 0 | 1 | 1 | 1 | shift up 7 positions |
| 0 | 0 | 0 | 1 | 0 | 0 | 0 | shift up 8 positions |
| 0 | 0 | 0 | 1 | 0 | 0 | 1 | shift up 9 positions |
| 0 | 0 | 0 | 1 | 0 | 1 | 0 | shift up 10 positions |
| 0 | 0 | 0 | 1 | 0 | 1 | 1 | shift up 11 positions |
| 0 | 0 | 0 | 1 | 1 | 0 | 0 | shift up 12 positions |
| 0 | 0 | 0 | 1 | 1 | 0 | 1 | shift up 13 positions |
| 0 | 0 | 0 | 1 | 1 | 1 | 0 | shift up 14 positions |
| 0 | 0 | 0 | 1 | 1 | 1 | 1 | shift up 15 positions |
| 0 | 0 | 1 | 0 | 0 | 0 | 0 | shift up 16 positions |
| 0 | 0 | 1 | 0 | 0 | 0 | 1 | shift up 17 positions |
| 0 | 0 | 1 | 0 | 0 | 1 | 0 | shift up 18 positions |
| 0 | 0 | 1 | 0 | 0 | 1 | 1 | shift up 19 positions |
| 0 | 0 | 1 | 0 | 1 | 0 | 0 | shift up 20 positions |
| 0 | 0 | 1 | 0 | 1 | 0 | 1 | shift up 21 positions |
| 0 | 0 | 1 | 0 | 1 | 1 | 0 | shift up 22 positions |
| 0 | 0 | 1 | 0 | 1 | 1 | 1 | shift up 23 positions |
| 0 | 0 | 1 | 1 | 0 | 0 | 0 | shift up 24 positions |
| 0 | 0 | 1 | 1 | 0 | 0 | 1 | shift up 25 positions |
| 0 | 0 | 1 | 1 | 0 | 1 | 0 | shift up 26 positions |
| 0 | 0 | 1 | 1 | 0 | 1 | 1 | shift up 27 positions |
| 0 | 0 | 1 | 1 | 1 | 0 | 0 | shift up 28 positions |
| 0 | 0 | 1 | 1 | 1 | 0 | 1 | shift up 29 positions |
| 0 | 0 | 1 | 1 | 1 | 1 | 0 | shift up 30 positions |
| 0 | 0 | 1 | 1 | 1 | 1 | 1 | shift up 31 positions |
| 0 | 1 | 0 | 0 | 0 | 0 | 0 | shift up 32 positions |
| 0 | 1 | 0 | 0 | 0 | 0 | 1 | shift up 33 positions |
| 0 | 1 | 0 | 0 | 0 | 1 | 0 | shift up 34 positions |
| 0 | 1 | 0 | 0 | 0 | 1 | 1 | shift up 35 positions |
| 0 | 1 | 0 | 0 | 1 | 0 | 0 | shift up 36 positions |
| 0 | 1 | 0 | 0 | 1 | 0 | 1 | shift up 37 positions |
| 0 | 1 | 0 | 0 | 1 | 1 | 0 | shift up 38 positions |
| 0 | 1 | 0 | 0 | 1 | 1 | 1 | shift up 39 positions |
| 0 | 1 | 0 | 1 | 0 | 0 | 0 | shift up 40 positions |
| 0 | 1 | 0 | 1 | 0 | 0 | 1 | shift up 41 positions |
| 0 | 1 | 0 | 1 | 0 | 1 | 0 | shift up 42 positions |
| 0 | 1 | 0 | 1 | 0 | 1 | 1 | shift up 43 positions |
| 0 | 1 | 0 | 1 | 1 | 0 | 0 | shift up 44 positions |
| 0 | 1 | 0 | 1 | 1 | 0 | 1 | shift up 45 positions |
| 0 | 1 | 0 | 1 | 1 | 1 | 0 | shift up 46 positions |
| 0 | 1 | 0 | 1 | 1 | 1 | 1 | shift up 47 positions |
| 0 | 1 | 1 | 0 | 0 | 0 | 0 | shift up 48 positions |
| 0 | 1 | 1 | 0 | 0 | 0 | 1 | shift up 49 positions |
| 0 | 1 | 1 | 0 | 0 | 1 | 0 | shift up 50 positions |
| 0 | 1 | 1 | 0 | 0 | 1 | 1 | shift up 51 positions |
| 0 | 1 | 1 | 0 | 1 | 0 | 0 | shift up 52 positions |
| 0 | 1 | 1 | 0 | 1 | 0 | 1 | shift up 53 positions |
| 0 | 1 | 1 | 0 | 1 | 1 | 0 | shift up 54 positions |
| 0 | 1 | 1 | 0 | 1 | 1 | 1 | shift up 55 positions |
| 0 | 1 | 1 | 1 | 0 | 0 | 0 | shift up 56 positions |
| 0 | 1 | 1 | 1 | 0 | 0 | 1 | shift up 57 positions |

| | | | | | | |
|---|---|---|---|---|---|---|
| 0 | 1 | 1 | 1 | 0 | 1 | 0 | shift up 58 positions |
| 0 | 1 | 1 | 1 | 0 | 1 | 1 | shift up 59 positions |
| 0 | 1 | 1 | 1 | 1 | 0 | 0 | shift up 60 positions |
| 0 | 1 | 1 | 1 | 1 | 0 | 1 | shift up 61 positions |
| 0 | 1 | 1 | 1 | 1 | 1 | 0 | shift up 62 positions |
| 0 | 1 | 1 | 1 | 1 | 1 | 1 | shift up 63 positions |
| 0 | 0 | 0 | 0 | 0 | 0 | 0 | shift down 64 positions |
| 1 | 0 | 0 | 0 | 0 | 0 | 1 | shift down 63 positions |
| 1 | 0 | 0 | 0 | 0 | 1 | 0 | shift down 62 positions |
| 1 | 0 | 0 | 0 | 0 | 1 | 1 | shift down 61 positions |
| 1 | 0 | 0 | 0 | 1 | 0 | 0 | shift down 60 positions |
| 1 | 0 | 0 | 0 | 1 | 0 | 1 | shift down 59 positions |
| 1 | 0 | 0 | 0 | 1 | 1 | 0 | shift down 58 positions |
| 1 | 0 | 0 | 0 | 1 | 1 | 1 | shift down 57 positions |
| 1 | 0 | 0 | 1 | 0 | 0 | 0 | shift down 56 positions |
| 1 | 0 | 0 | 1 | 0 | 0 | 1 | shift down 55 positions |
| 1 | 0 | 0 | 1 | 0 | 1 | 0 | shift down 54 positions |
| 1 | 0 | 0 | 1 | 0 | 1 | 1 | shift down 53 positions |
| 1 | 0 | 0 | 1 | 1 | 0 | 0 | shift down 52 positions |
| 1 | 0 | 0 | 1 | 1 | 0 | 1 | shift down 51 positions |
| 1 | 0 | 0 | 1 | 1 | 1 | 0 | shift down 50 positions |
| 1 | 0 | 0 | 1 | 1 | 1 | 1 | shift down 49 positions |
| 1 | 0 | 1 | 0 | 0 | 0 | 0 | shift down 48 positions |
| 1 | 0 | 1 | 0 | 0 | 0 | 1 | shift down 47 positions |
| 1 | 0 | 1 | 0 | 0 | 1 | 0 | shift down 46 positions |
| 1 | 0 | 1 | 0 | 0 | 1 | 1 | shift down 45 positions |
| 1 | 0 | 1 | 0 | 1 | 0 | 0 | shift down 44 positions |
| 1 | 0 | 1 | 0 | 1 | 0 | 1 | shift down 43 positions |
| 1 | 0 | 1 | 0 | 1 | 1 | 0 | shift down 42 positions |
| 1 | 0 | 1 | 0 | 1 | 1 | 1 | shift down 41 positions |
| 1 | 0 | 1 | 1 | 0 | 0 | 0 | shift down 40 positions |
| 1 | 0 | 1 | 1 | 0 | 0 | 1 | shift down 39 positions |
| 1 | 0 | 1 | 1 | 0 | 1 | 0 | shift down 38 positions |
| 1 | 0 | 1 | 1 | 0 | 1 | 1 | shift down 37 positions |
| 1 | 0 | 1 | 1 | 1 | 0 | 0 | shift down 36 positions |
| 1 | 0 | 1 | 1 | 1 | 0 | 1 | shift down 35 positions |
| 1 | 0 | 1 | 1 | 1 | 1 | 0 | shift down 34 positions |
| 1 | 0 | 1 | 1 | 1 | 1 | 1 | shift down 33 positions |
| 1 | 1 | 0 | 0 | 0 | 0 | 0 | shift down 32 positions |
| 1 | 1 | 0 | 0 | 0 | 0 | 1 | shift down 31 positions |
| 1 | 1 | 0 | 0 | 0 | 1 | 0 | shift down 30 positions |
| 1 | 1 | 0 | 0 | 0 | 1 | 1 | shift down 29 positions |
| 1 | 1 | 0 | 0 | 1 | 0 | 0 | shift down 28 positions |
| 1 | 1 | 0 | 0 | 1 | 0 | 1 | shift down 27 positions |
| 1 | 1 | 0 | 0 | 1 | 1 | 0 | shift down 26 positions |
| 1 | 1 | 0 | 0 | 1 | 1 | 1 | shift down 25 positions |
| 1 | 1 | 0 | 1 | 0 | 0 | 0 | shift down 24 positions |
| 1 | 1 | 0 | 1 | 0 | 0 | 1 | shift down 23 positions |
| 1 | 1 | 0 | 1 | 0 | 1 | 0 | shift down 22 positions |
| 1 | 1 | 0 | 1 | 0 | 1 | 1 | shift down 21 positions |
| 1 | 1 | 0 | 1 | 1 | 0 | 0 | shift down 20 positions |
| 1 | 1 | 0 | 1 | 1 | 0 | 1 | shift down 19 positions |
| 1 | 1 | 0 | 1 | 1 | 1 | 0 | shift down 18 positions |
| 1 | 1 | 0 | 1 | 1 | 1 | 1 | shift down 17 positions |
| 1 | 1 | 1 | 0 | 0 | 0 | 0 | shift down 16 positions |
| 1 | 1 | 1 | 0 | 0 | 0 | 1 | shift down 15 positions |
| 1 | 1 | 1 | 0 | 0 | 1 | 0 | shift down 14 positions |
| 1 | 1 | 1 | 0 | 0 | 1 | 1 | shift down 13 positions |
| 1 | 1 | 1 | 0 | 1 | 0 | 0 | shift down 12 positions |
| 1 | 1 | 1 | 0 | 1 | 0 | 1 | shift down 11 positions |
| 1 | 1 | 1 | 0 | 1 | 1 | 0 | shift down 10 positions |
| 1 | 1 | 1 | 0 | 1 | 1 | 1 | shift down 9 positions |
| 1 | 1 | 1 | 1 | 0 | 0 | 0 | shift down 8 positions |
| 1 | 1 | 1 | 1 | 0 | 0 | 1 | shift down 7 positions |
| 1 | 1 | 1 | 1 | 0 | 1 | 0 | shift down 6 positions |
| 1 | 1 | 1 | 1 | 0 | 1 | 1 | shift down 5 positions |
| 1 | 1 | 1 | 1 | 1 | 0 | 0 | shift down 4 positions |
| 1 | 1 | 1 | 1 | 1 | 0 | 1 | shift down 3 positions |
| 1 | 1 | 1 | 1 | 1 | 1 | 0 | shift down 2 positions |
| 1 | 1 | 1 | 1 | 1 | 1 | 1 | shift down 1 position |

Mode 32:

| 63 | 0 |
|---|---|
| FH | FL |

Negative Start Position ← → Positive Start Position

Shift X or Y Logically Up and Fill With 0.
Bus 246 Signals Select 0,X.
Bus 242 Signals Specify the Number of Shift Positions: 0001000B.

| 31 | FH | 0 | | 31 | FL | 0 |
|---|---|---|---|---|---|---|
| X7 X6 X5 X4 X3 X2 X1 X0 | | | | 0 0 0 0 0 0 0 0 | | |

-continued

```
31         W          0
[ X5 X4 X3 X2 X1 X0  0  0 ]
```

Shift X or Y Logically Down and Fill With 0.
Bus 246 Signals Select 0,X.
Bus 242 Signals Specify the Number of Shift Positions: 1111000B.

```
31       FH         0        31       FL         0
[ 0  0  0  0  0  0  0  0 ]   [ X7 X6 X5 X4 X3 X2 X1 X0 ]
                              31         W          0
                              [ 0  0 X7 X6 X5 X4 X3 X2 ]
```

Shift X or Y Logically Up and Fill With Mlink.
Bus 246 Signals Select Mlink,X.
Bus 242 Signals Specify the Number of Shift Positions: 0010000B.

```
31       FH         0        31       FL         0
[ X7 X6 X5 X4 X3 X2 X1 X0 ]  [ M1 M1 M1 M1 M1 M1 M1 M1 ]
31         W          0
[ X5 X4 X3 X2 X1 X0 M1 M1 ]
```

Shift X or Y Logically Down and Fill With Mlink.
Bus 246 Signals Select Mlink,X.
Bus 242 Signals Specify the Number of Shift Positions: 1111000B.

```
31       FH         0        31       FL         0
[ M1 M1 M1 M1 M1 M1 M1 M1 ]  [ X7 X6 X5 X4 X3 X2 X1 X0 ]
                              31         W          0
                              [ M1 M1 X7 X6 X5 X4 X3 X2 ]
```

Extract a Thirty-Two Bit Number From a Sixty-Four Bit Number.
Bus 246 Signals Select X,Y.
Bus 242 Signals Specify the Start Position: 0001000B.

```
31       FH         0        31       FL         0
[ X7 X6 X5 X4 X3 X2 X1 X0 ]  [ Y7 Y6 Y5 Y4 Y3 Y2 Y1 Y0 ]
31         W          0
[ X1 X0 Y7 Y6 Y5 Y4 Y3 Y2 ]
```

Select Y,X.
Bus 246 Signals Selects X,Y.
Bus 242 Signals Specify the Start Position: 0001000B.

```
31       FH         0        31       FL         0
[ Y7 Y6 Y5 Y4 Y3 Y2 Y1 Y0 ]  [ X7 X6 X5 X4 X3 X2 X1 X0 ]
31         W          0
[ Y1 Y0 X7 X6 X5 X4 X3 X2 ]
```

Shift X or Y Arithmetically Up and Fill With 0.
Bus 246 Signals Select Sign X/Sign Y,X X/Y.
Bus 242 Signals Specify the Number of Shift Positions: 0000100B.

```
31              FH              0
[ X73 X72 X71 X70 X6 X5 X4 X3 X2 X1 X0 ]

31       FL         0
                                 [ 0  0  0  0  0  0  0  0 ]

31              W               0
[ X73 X62 X61 X60 X5 X4 X3 X2 X1 0 ]
```

Shift X or Y Arithmetically Down and Sign Extension.
Bus 246 Signals Select Sign X/Sign Y, X/Y.
Bus 242 Signals Specify the Number of Shift Positions: 111000B.

```
31          FH           0
[ X73 X73 X73 X73 X73 X73 X73 X73 ]

31       FL         0
                                 [ X7 X6 X5 X4 X3 X2 X1 X0 ]

31         W          0
[ X73 X73 X7 X6 X5 X4 X3 X2 ]
```

Shift X or Y Arithmetically Up and Fill With Mlink.
Bus 246 Signals Select Mlink, X/Y.
Bus 242 Signals Specify the Number of Shift Positions: 000100B.

```
31              FH              0
[ X73 X72 X71 X70 X6 X5 X4 X3 X2 X1 X0 ]

31       FL         0
                                 [ M1 M1 M1 M1 M1 M1 M1 M1 ]

31              W               0
[ X73 X62 X61 X60 X5 X4 X3 X2 X1 M1 ]
```

Shift X or Y Arithmetically Down and Fill With Mlink.
Bus 246 Signals Select Mlink, X/Y.

-continued

Bus 242 Signals Specify the Number of Shift Positions: 1111101B.

```
31        FH            0
[ M1 M1 M1 M1 M1 M1 M1 M1 ]
                              31              FL             0
                              [ X73 X72 X71 X70 X6 X5 X4 X3 X2 X1 X0 ]
31                         W                                          0
[ X73 M1 M1 M1 X72 X71 X70 X63 X62 X61 X60 X53 X52 X51 X50
  X43 X42 X41 X40 X33 X32 X31 X30 X23 X22 X21 X20 X13 X12
                    0
  X11 X10 X3 X2 X1 X0 ]
```

Rotate X or Y Up N Positions.
Bus 246 Signals Select X,X or Y,Y.
Bus 242 Signals Specify the Number of Shift Positions: 001000B.

```
31      FH           0          31      FL           0
[ X7 X6 X5 X4 X3 X2 X1 X0 ]     [ X7 X6 X5 X4 X3 X2 X1 X0 ]
31       W           0
[ X5 X4 X3 X2 X1 X0 X7 X6 ]
```

Rotate X or Y Down N Positions.
Bus 246 Signals Select X,X or Y,Y.
Bus 242 Signals Specify the Number of Shift Positions: 001000B.

```
31      FH           0          31      FL           0
[ X7 X6 X5 X4 X3 X2 X1 X0 ]     [ X7 X6 X5 X4 X3 X2 X1 X0 ]
                                31       W           0
                                [ X1 X0 X7 X6 X5 X4 X3 X2 ]
```

Shift X or Y Logically Up and Fill With 0.
Bus 246 Signals Select 0,X/Y.
Bus 242 Signals Specify the Number of Shift Positions: 0000100B.
The least significant slice is dependent on the shift position,
the funnel shifter multiplexer providing either X,0 or 0,0.

```
31         FH            0       31       FL           0
[ XL7 XL6 XL5 XL4 XL3 XL2 XL1 XL0 ]   [ 0 0 0 0 0 0 0 0 ]
31          W            0
[ XL6 XL5 XL4 XL3 XL2 XL1 XL0 0 ]
```

The most significant slice is dependent on the signal S, the
funnel shifter multiplexer providing either X,Y or Y,0.

```
31         FH            0       31       FL           0
[ XH7 XH6 XH5 XH4 XH3 XH2 XH1 XH0 ]   [ 0 0 0 0 0 0 0 0 ]
31          W            0
[ XH6 XH5 XH4 XH3 XH2 XH1 XH1 XL7 ]
```

Shift X or Y Logically Down and Fill With 0.
Bus 246 Signals Select 0,X/Y.
Bus 242 Signals Specify the Number of Shift Positions: 1111100B.
The least significant slice is dependent on the shift position,
the funnel shifter multiplexer providing either Y,X or 0,X

```
31         FH            0
[ XH7 XH6 XH5 XH4 XH3 XH2 XH1 XH0 ]
                              31       FL           0
                              [ XL7 XL6 XL5 XL4 XL3 XL2 XL1 XL0 ]
                              31        W           0
                              [ XH0 XL7 XL6 XL5 XL4 XL3 XL2 XL1 ]
```

The most significant slice is dependent on the signal S, the
funnel shifter multiplexer providing either 0,X or 0,0

```
31      FH           0          31         FL            0
[ 0 0 0 0 0 0 0 0 ]             [ XH7 XH6 XH5 XH4 XH3 XH2 XH1 XH0 ]
                                31          W            0
                                [ 0 XH6 XH5 XH4 XH3 XH2 XH1 XH0 ]
```

Shift X or Y Logically Up and Fill With Mlink.
Bus 246 Signals Select Mlink,X/Y.
Bus 242 Signals Specify the Number of Shift Positions: 0000100B.
The least significant slice is dependent on the shift position,
the funnel shifter multiplexer providing either X,Mlink or
Mlink,Mlink.

```
31         FH            0       31       FL           0
[ XL7 XL6 XL5 XL4 XL3 XL2 XL1 XL0 ]   [ M1 M1 M1 M1 M1 M1 M1 M1 ]
31          W            0
[ XL6 XL5 XL4 XL3 XL2 XL1 XL0 M1 ]
```

The most significant slice is dependent on the signal S, the

-continued funnel shifter multiplexer selecting either X,Y or Y,Mlink.

```
31        FH              0
[XH7 XH6 XH5 XH4 XH3 XH2 XH1 XH0]
                                    31        FL              0
                                    [XL7 XL6 XL5 XL4 XL3 XL2 XL1 XL0]
31        W               0
[XH6 XH5 XH4 XH3 XH2 XH1 XH0 XL7]
```

Shift X or Y Logically Down and Fill With Mlink.
Bus 246 Signals Select Mlink,X/Y.
Bus 242 Signals Specify the Number of Shift Positions: 1111100B.
The least significant slice is dependent on the shift position,
the funnel shifter multiplexer selecting either Y,X or 0,X.

```
31        FH              0
[XH7 XH6 XH5 XH4 XH3 XH2 XH1 XH0]
                                    31        FL              0
                                    [XL7 XL6 XL5 XL4 XL3 XL2 XL1 XL0]
                                    31        W               0
                                    [XH0 XL6 XL5 XL4 XL3 XL2 XL1 XL0]
```

The most significant slice is dependent on the signal S, the
funnel shifter multiplexer selecting either Mlink,X or
Mlink,Mlink.

```
31        FH              0         31        FL              0
[M1 M1 M1 M1 M1 M1 M1 M1]           [XH7 XH6 XH5 XH4 XH3 XH2 XH1 XH0]
                                    31        W               0
                                    [M1 XH7 XH6 XH5 XH4 XH3 XH2 XH1]
```

Extract a Sixty-Four Bit Number From a One-Hundred-and-Twenty-Eight Bit Number.

Bus 246 Signals Select X/Y.
Bus 242 Signals Specify the Start position: 0001000B.
The least significant slice

```
31        FH              0
[XL7 XL6 XL5 XL4 XL3 XL2 XL1 XL0]
                                    31        FL              0
                                    [YL7 YL6 YL5 YL4 YL3 YL2 YL1 YL0]
31        W               0
[XL1 XL0 YL7 YL6 YL5 YL4 YL3 YL2]
```

The most significant slice

```
31        FH              0
[XH7 XH6 XH5 XH4 XH3 XH2 XH1 XH0]
                                    31        FL              0
                                    [YH7 YH6 YH5 YH4 YH3 YH2 YH1 YH0]
31        W               0
[XH1 XH0 YH7 YH6 YH5 YH4 YH3 YH2]
```

Shift X or Y Up Arithmetically and Fill With 0.
Bus 246 Signals Select Sign X/Sign Y, X/Y.
Bus 242 Signals Specify the Number of Shift Positions: 00001000B.
The least significant slice is dependent on the shift position,
the funnel shifter multiplexer selecting either X,0 or 0,0.

```
31        FH              0         31        FL              0
[XL7 XL6 XL5 XL4 XL3 XL2 XL1 XL0]   [0  0  0  0  0  0  0  0]
31        W               0
[XL6 XL5 XL4 XL3 XL2 XL1 XL0 0]
```

The most significant slice is dependent on the shift position,
the funnel shifter multiplexer selecting either X,Y or Y,0 (shift
round sign bit XH73).

```
31        FH              0
[XH73 XH72 XH71 XH70 X6 X5 X4 X3 X2 X1 X0]
                                    31        FL              0
                                    [XL7 XL6 XL5 XL4 XL3 XL2 XL1 XL0]
31        W               0
[XH73 XH62 XH61 XH60 XH5 XH4 XH3 XH2 XH1 XH0]
```

Shift X or Y Down Arithmetically and Sign Extension.
Bus 246 Signals Select Sign X/Sign Y, X/Y.
Bus 242 Signals Specify the Number of Shift Positions: 1111100B.
The least significant slice is dependent on the shift position,
the funnel shifter multiplexer selecting either Y,X or sign X,X.

```
31        FH              0
[XH7 XH6 XH5 XH4 XH3 XH2 XH1 XH0]
```

-continued

| 31 | | | | FL | | | 0 |
|---|---|---|---|---|---|---|---|
| XL7 | XL6 | XL5 | XL4 | XL3 | XL2 | XL1 | XL0 |

| 31 | | | | W | | | 0 |
|---|---|---|---|---|---|---|---|
| XH0 | XL7 | XL6 | XL5 | XL4 | XL3 | XL2 | XL1 |

The most significant slice is dependent on the signal S, the
funnel shifter multiplexer selecting either sign X/sign Y, X/Y or
sign X/sign Y.

| 31 | | | | FH | | | 0 |
|---|---|---|---|---|---|---|---|
| XH73 | XH73 | XH73 | XH73 | XH73 | XH73 | XH73 | XH73 |

| 31 | | | | FL | | | 0 |
|---|---|---|---|---|---|---|---|
| XH73 | XH72 | XH71 | XH70 | XH6 | XH5 | XH4 | XH3 | XH2 | XH1 | XH0 |

| 31 | | | | W | | | 0 |
|---|---|---|---|---|---|---|---|
| XH73 | XH7 | XH6 | XH5 | XH4 | XH3 | XH2 | XH1 | XH0 |

Shift X or Y Up Arithmetically and Fill Mlink.
Bus 246 Signals Select Mlink, X/Y.
Bus 242 Signals Specify the Number of Shift Positions: 0000100B.
The least significant slice is dependent on the shift position,
the funnel shifter multiplexer selecting either X,Y, Mlink or
Mlink,Mlink.

| 31 | | | | FH | | | 0 |
|---|---|---|---|---|---|---|---|
| XL7 | XL6 | XL5 | XL4 | XL3 | XL2 | XL1 | XL0 |

| 31 | | | | FL | | | 0 |
|---|---|---|---|---|---|---|---|
| Ml | Ml | Ml | Ml | Ml | Ml | Ml | Ml |

| 31 | | | | W | | | 0 |
|---|---|---|---|---|---|---|---|
| XL6 | XL5 | XL4 | XL3 | XL2 | XL1 | XL0 | Ml |

The most significant slice is dependent on the shift position,
the funnel shifter multiplexer selecting either X,Y or Y,Mlink

| 31 | | | | FH | | | 0 |
|---|---|---|---|---|---|---|---|
| XH73 | XH72 | XH71 | XH70 | XH6 | XH5 | XH4 | XH3 | XH2 | XH1 | XH0 |

| 31 | | | | FL | | | 0 |
|---|---|---|---|---|---|---|---|
| XL7 | XL6 | XL5 | XL4 | XL3 | XL2 | XL1 | XL0 |

| 31 | | | | W | | | 0 |
|---|---|---|---|---|---|---|---|
| XH73 | XH62 | XH61 | XH60 | XH5 | XH4 | XH3 | XH2 | XH1 | XH0 |

Shift X/Y Down Arithmetically and Fill With Mlink.
Bus 246 Signals Select Mlink, X/Y.
Bus 242 Signals Specify the Number of Shift Positions: 1111100B.
The least significant slice is dependent on the shift position,
the funnel shifter multiplexer selecting either Y,X or Mlink,Y.

| 31 | | | | FH | | | 0 |
|---|---|---|---|---|---|---|---|
| XH7 | XH6 | XH5 | XH4 | XH3 | XH2 | XH1 | XH0 |

| 31 | | | | FL | | | 0 |
|---|---|---|---|---|---|---|---|
| XL7 | XL6 | XL5 | XL4 | XL3 | XL2 | XL1 | XL0 |

| 31 | | | | W | | | 0 |
|---|---|---|---|---|---|---|---|
| XH0 | XL7 | XL6 | XL5 | XL4 | XL3 | XL2 | XL1 |

The most significant slice is dependent on the shift position,
the funnel shifter multiplexer selecting either Mlink,X or
Mlink,Mlink.

| 31 | | | | FH | | | 0 |
|---|---|---|---|---|---|---|---|
| Ml | Ml | Ml | Ml | Ml | Ml | Ml | Ml |

| 31 | | | | FL | | | 0 |
|---|---|---|---|---|---|---|---|
| XH73 | XH72 | XH71 | XH70 | XH6 | XH5 | XH4 | XH3 | XH2 | XH1 | XH0 |

| 31 | | | | W | | | 0 |
|---|---|---|---|---|---|---|---|
| XH73 | XH62 | XH61 | XH60 | XH5 | XH4 | XH3 | XH2 | XH1 | XH0 |

Rotate X,Y N Positions.
Bus 246 Signals Select X,X/Y,Y.
Bus 242 Signals Specify the Number of Shift Positions: 000100B.
Least significant slice.

| 31 | | | | FH | | | 0 |
|---|---|---|---|---|---|---|---|
| XL7 | XL6 | XL5 | XL4 | XL3 | XL2 | XL1 | XL0 |

| 31 | | | | FL | | | 0 |
|---|---|---|---|---|---|---|---|
| XH7 | XH6 | XH5 | XH4 | XH3 | XH2 | XH1 | XH0 |

| 31 | | | | W | | | 0 |
|---|---|---|---|---|---|---|---|
| XL6 | XL5 | XL4 | XL3 | XL2 | XL1 | XL0 | XH7 |

The most significant slice.

| 31 | | | | FH | | | 0 |
|---|---|---|---|---|---|---|---|
| XH7 | XH6 | XH5 | XH4 | XH3 | XH2 | XH1 | XH0 |

| 31 | | | | FL | | | 0 |
|---|---|---|---|---|---|---|---|
| XL7 | XL6 | XL5 | XL4 | XL3 | XL2 | XL1 | XL0 |

| 31 | | | | W | | | 0 |
|---|---|---|---|---|---|---|---|
| XH6 | XH5 | XH4 | XH3 | XH2 | XH1 | XH0 | XL7 |

Mask generator 402 has a set of seven inputs, each of which is connected to a respective line of the seven lines of (SP) bus 242 to receive the externally generated, movable window start position designating signals; a set of thirty-two inputs, each of which is connected to the respective line of the thirty-two lines of (T) bus 180; a set of thirty-two inputs, each of which is connected to the respective line of the thirty-two lines of (Q) bus 284; and a set of three inputs, each of which is connected to a respective line of the three lines of (W) bus 244 to receive externally generated, alternative, width designating signals. Additionally, mask generator 402 has a set of two inputs, each of which is connected to a respective line of the two lowest order lines of a three line bus 452 to receive externally generated, mask generator 402 controlling, mask selecting signals, and a set of two inputs, each of which is connected to a respective line of the two lines of bus 210 to receive the slice number specifying signals. Further, mask generator 402 has a set of thirty-two outputs, each of shich is connected to the respective line of the thirty-two lines of (M) bus 350.

Under control of the mask generator 402 controlling, mask selecting signals, externally generated on the two lowest order lines of the three lines of bus 452, signals representing a mask (a pattern of logical ones) can be developed on (M) bus 350 by mask generator 402 in four different ways. The start position can be specified by the signals developed on the seven lines of (SP) bus 242 or by the signals developed on the seven lowest order lines of the thirty-two lines of (T) bus 180. The width (the number of ones) can be specified by the signals developed on the three lines of (W) bus 244 or by the signals developed on the the six lowest order lines of the thirty-two lines of (Q) bus 284. Alternatively, the signals developed on the thirty-two lines of (T) bus 180 or the signals developed on (Q) bus 284 can be coupled to (M) bus 350 as a mask (pattern of ones and zeros). (The ability to use the (T) bus 180 and/or (Q) bus 284 signals (in conjunction with seven-port random access memory (RAM) unit 128 and arithmetic logic unit (ALU) 406) permits the use of an old mask after it has been altered by an arithmetic logic unit operation.) In a sixty-four bit system in which two slices are cascaded, only the (T) bus 180 and (Q) bus 284 signals of the least significant slice are used to specify the mask start position and width. The signals developed on bus 452 are used to control the broadcasting of the seven least significant (T) bus 180 signals and the six least significant (Q) bus 284 signals to the most significant slice by means of (SP) bus 242, (W) bus 244, bus 200 and line 184. The following mask generator 402 truth table illustrates the signal broadcasting format.

Signal broadcasting Format:
Start Position:
| SP6 | SP5 | SP4 | SP3 | SP2 | SP1 | SP0 |
|---|---|---|---|---|---|---|
| Q6 | Q5 | Q4 | Q3 | Q2 | Q1 | Q0 |

Width:
| TTsel1 | Tsel0 | TC31 | W2 | W1 | W0 |
|---|---|---|---|---|---|
| T5 | T4 | T3 | T2 | T1 | T0 |

Employed in mask generator 402 (but not shown) are a number of "look up table" type units including one for "width mapping" numbers represented by (W) bus 244 signals, one for start position numbers and two for word length numbers. One of the word length look up table units is for numbers represented by (W) bus 244 signals; and, the other word length look up table units is for numbers represented by the six lowest order (Q) bus 284 signals. Additionally, mask generator 402 employs a start position multiplexer, a width multiplexer, a word length adder, a word length multiplexer, a logical AND unit, an output multiplexer, and a multiplexer control unit. The start position multiplexer has a set of seven data inputs, which are each connected to receive the respective one of the (SP) bus 242 signals, a set of seven data inputs, which are each connected to receive the respective one of the seven lowest order (T) bus 180 signals, a set of two control (select) inputs, which are each connected to receive the respective one of the two lowest order signals of the three bus 452 signals, and a set of data outputs, which are each connected to a respective line of a start position bus. The width mapping look up table unit has a set of three data inputs, which are each connected to receive the respective one of the three (W) bus 244 signals and a number of seven data outputs.

The width multiplexer has a set of seven data inputs, which are each connected to the respective one of the seven data outputs of the width mapping look up table unit; a set of six data inputs, which are each connected to receive the respective one of the six lowest order (Q) bus 284 signals, a set of two control (select) inputs, which are each connected to receive the respective one of the two lowest order signals of the three bus 452 signals, and a set of data outputs. The word length adder has a set of data inputs, which are each connected to the respective line of the start position bus, another set of data inpus, which are each connected to the receive one of the width multiplexer data outputs, and a number of data outputs. The start position look up table unit has a set of data inputs, each of which is connected to the respective one of the start position bus lines and a number of data outputs. Both of the word length look up table units have a set of data inputs, each of which is connected to the respective one of the outputs of the word length adder and a number of data outputs. The word length multiplexer has two sets of data inputs, the data inputs of one set being connected each to the respective one of the data outputs of one of the word length look up table units and the data inputs of the other set being connected each to the respective one of the data outputs of the other word length look up table units. Additionally, the word length multiplexer has a set of two control (select) inputs, which are also each connected to receive the respective one of the two lowest order signals of the three bus 452 signals and a set of data outputs.

Logical AND unit has a set of inputs, each of which is connected to the respective one of the data outputs of the start position look up table unit; another set of inputs, each of which is connected to the respective one of the data outputs of the word length multiplexer; and a set of sixty-four outputs. The output multiplexer has six sets of thirty-two data inputs. The combination of the data inputs of two of the sets of the data inputs of the output multiplexer are connected, each to the respective one of the sixty-four outputs of the logical AND unit. Still another set of the data inputs of the output multiplexer are connected, each to receive a respective one of the thirty-two (T) bus 180 signals; and, the last set of data inputs of the output multiplexer are connected, each to receive a respective one of the thirty-two (Q) bus 284 signals. Further, the output multiplexer has a set of two control (select) inputs and a set of thirty-two data outputs, which are each connected to the respective one of the thirty-two lines of (M) bus 350. Finally, the multiplexer control unit has a set of inputs, each of which is connected to a respective one of the outputs of the word length adder, a set of two inputs, each of which is connected to receive the respective one of the two lowest order signals of the three bus 452 signals, a set of two inputs, each of which is connected to receive a respective one of the two bus 210 signals, and a set of two outputs, each of which is connected to the respective one of the two control inputs of the output multiplexer.

As previously indicated, under control of the signals, externally generated on the two lowest order lines of the three bus 452 lines, the start position can be specified either by the signals developed on the seven lines of (SP) bus 242 or by the signals developed on the seven lowest order lines of the thirty-two lines of (T) bus 180; and, the width can be specified either by the signals developed on the three lines of (W) bus 244 or by the signals developed on the the six lowest order lines of the thirty-two lines of (Q) bus 284. When the (W) bus 244 signals are selected, the data outputs of the width mapping table unit are selected, from which the actual word-length is calculated. The word length and the start position are decoded by means of bar graph tables in the look up table units. The sixty-four bit number represented by signals developed by the word length look up table unit is logically anded with the sixty-four bit number represented by the signals developed by the start position look up table unit.

The following truth tables illustrate the operation of mask generator 402.

| | | | Start Position: (specified in seven bit, two's complement format) (SP) Bus 242 signals | | | | |
|---|---|---|---|---|---|---|---|
| 6 | 5 | 4 | 3 | 2 | 1 | 0 | Start Position |
| 0 | 0 | 0 | 0 | 0 | 0 | 0 | 0 |
| 0 | 0 | 0 | 0 | 0 | 0 | 1 | 1 |
| 0 | 0 | 0 | 0 | 0 | 1 | 0 | 2 |
| 0 | 0 | 0 | 0 | 0 | 1 | 1 | 3 |
| 0 | 0 | 0 | 0 | 1 | 0 | 0 | 4 |
| 0 | 0 | 0 | 0 | 1 | 0 | 1 | 5 |
| 0 | 0 | 0 | 0 | 1 | 1 | 0 | 6 |
| 0 | 0 | 0 | 0 | 1 | 1 | 1 | 7 |
| 0 | 0 | 0 | 1 | 0 | 0 | 0 | 8 |
| 0 | 0 | 0 | 1 | 0 | 0 | 1 | 9 |
| 0 | 0 | 0 | 1 | 0 | 1 | 0 | 10 |
| 0 | 0 | 0 | 1 | 0 | 1 | 1 | 11 |
| 0 | 0 | 0 | 1 | 1 | 0 | 0 | 12 |
| 0 | 0 | 0 | 1 | 1 | 0 | 1 | 13 |
| 0 | 0 | 0 | 1 | 1 | 1 | 0 | 14 |
| 0 | 0 | 0 | 1 | 1 | 1 | 1 | 15 |
| 0 | 0 | 1 | 0 | 0 | 0 | 0 | 16 |
| 0 | 0 | 1 | 0 | 0 | 0 | 1 | 17 |
| 0 | 0 | 1 | 0 | 0 | 1 | 0 | 18 |
| 0 | 0 | 1 | 0 | 0 | 1 | 1 | 19 |
| 0 | 0 | 1 | 0 | 1 | 0 | 0 | 20 |
| 0 | 0 | 1 | 0 | 1 | 0 | 1 | 21 |
| 0 | 0 | 1 | 0 | 1 | 1 | 0 | 22 |
| 0 | 0 | 1 | 0 | 1 | 1 | 1 | 23 |
| 0 | 0 | 1 | 1 | 0 | 0 | 0 | 24 |
| 0 | 0 | 1 | 1 | 0 | 0 | 1 | 25 |
| 0 | 0 | 1 | 1 | 0 | 1 | 0 | 26 |
| 0 | 0 | 1 | 1 | 0 | 1 | 1 | 27 |
| 0 | 0 | 1 | 1 | 1 | 0 | 0 | 28 |
| 0 | 0 | 1 | 1 | 1 | 0 | 1 | 29 |
| 0 | 0 | 1 | 1 | 1 | 1 | 0 | 30 |
| 0 | 0 | 1 | 1 | 1 | 1 | 1 | 31 |
| 0 | 1 | 0 | 0 | 0 | 0 | 0 | 32 |
| 0 | 1 | 0 | 0 | 0 | 0 | 1 | 33 |
| 0 | 1 | 0 | 0 | 0 | 1 | 0 | 34 |
| 0 | 1 | 0 | 0 | 0 | 1 | 1 | 35 |
| 0 | 1 | 0 | 0 | 1 | 0 | 0 | 36 |
| 0 | 1 | 0 | 0 | 1 | 0 | 1 | 37 |
| 0 | 1 | 0 | 0 | 1 | 1 | 0 | 38 |
| 0 | 1 | 0 | 0 | 1 | 1 | 1 | 39 |
| 0 | 1 | 0 | 1 | 0 | 0 | 0 | 40 |
| 0 | 1 | 0 | 1 | 0 | 0 | 1 | 41 |
| 0 | 1 | 0 | 1 | 0 | 1 | 0 | 42 |
| 0 | 1 | 0 | 1 | 0 | 1 | 1 | 43 |
| 0 | 1 | 0 | 1 | 1 | 0 | 0 | 44 |
| 0 | 1 | 0 | 1 | 1 | 0 | 1 | 45 |
| 0 | 1 | 0 | 1 | 1 | 1 | 0 | 46 |
| 0 | 1 | 0 | 1 | 1 | 1 | 1 | 47 |
| 0 | 1 | 1 | 0 | 0 | 0 | 0 | 48 |
| 0 | 1 | 1 | 0 | 0 | 0 | 1 | 49 |
| 0 | 1 | 1 | 0 | 0 | 1 | 0 | 50 |
| 0 | 1 | 1 | 0 | 0 | 1 | 1 | 51 |
| 0 | 1 | 1 | 0 | 1 | 0 | 0 | 52 |
| 0 | 1 | 1 | 0 | 1 | 0 | 1 | 53 |
| 0 | 1 | 1 | 0 | 1 | 1 | 0 | 54 |
| 0 | 1 | 1 | 0 | 1 | 1 | 1 | 55 |

-continued

| | | | | | | | |
|---|---|---|---|---|---|---|---|
| 0 | 1 | 1 | 1 | 0 | 0 | 0 | 56 |
| 0 | 1 | 1 | 1 | 0 | 0 | 1 | 57 |
| 0 | 1 | 1 | 1 | 0 | 1 | 0 | 58 |
| 0 | 1 | 1 | 1 | 0 | 1 | 1 | 59 |
| 0 | 1 | 1 | 1 | 1 | 0 | 0 | 60 |
| 0 | 1 | 1 | 1 | 1 | 0 | 1 | 61 |
| 0 | 1 | 1 | 1 | 1 | 1 | 0 | 62 |
| 0 | 1 | 1 | 1 | 1 | 1 | 1 | 63 |
| 1 | 0 | 0 | 0 | 0 | 0 | 0 | 0 |
| 1 | 0 | 0 | 0 | 0 | 0 | 1 | 0 |
| 1 | 0 | 0 | 0 | 0 | 1 | 0 | 0 |
| 1 | 0 | 0 | 0 | 0 | 1 | 1 | 0 |
| 1 | 0 | 0 | 0 | 1 | 0 | 0 | 0 |
| 1 | 0 | 0 | 0 | 1 | 0 | 1 | 0 |
| 1 | 0 | 0 | 0 | 1 | 1 | 0 | 0 |
| 1 | 0 | 0 | 0 | 1 | 1 | 1 | 0 |
| 1 | 0 | 0 | 1 | 0 | 0 | 0 | 0 |
| 1 | 0 | 0 | 1 | 0 | 0 | 1 | 0 |
| 1 | 0 | 0 | 1 | 0 | 1 | 0 | 0 |
| 1 | 0 | 0 | 1 | 0 | 1 | 1 | 0 |
| 1 | 0 | 0 | 1 | 1 | 0 | 0 | 0 |
| 1 | 0 | 0 | 1 | 1 | 0 | 1 | 0 |
| 1 | 0 | 0 | 1 | 1 | 1 | 0 | 0 |
| 1 | 0 | 0 | 1 | 1 | 1 | 1 | 0 |
| 1 | 0 | 1 | 0 | 0 | 0 | 0 | 0 |
| 1 | 0 | 1 | 0 | 0 | 0 | 1 | 0 |
| 1 | 0 | 1 | 0 | 0 | 1 | 0 | 0 |
| 1 | 0 | 1 | 0 | 0 | 1 | 1 | 0 |
| 1 | 0 | 1 | 0 | 1 | 0 | 0 | 0 |
| 1 | 0 | 1 | 0 | 1 | 0 | 1 | 0 |
| 1 | 0 | 1 | 0 | 1 | 1 | 0 | 0 |
| 1 | 0 | 1 | 0 | 1 | 1 | 1 | 0 |
| 1 | 0 | 1 | 1 | 0 | 0 | 0 | 0 |
| 1 | 0 | 1 | 1 | 0 | 0 | 1 | 0 |
| 1 | 0 | 1 | 1 | 0 | 1 | 0 | 0 |
| 1 | 0 | 1 | 1 | 0 | 1 | 1 | 0 |
| 1 | 0 | 1 | 1 | 1 | 0 | 0 | 0 |
| 1 | 0 | 1 | 1 | 1 | 0 | 1 | 0 |
| 1 | 0 | 1 | 1 | 1 | 1 | 0 | 0 |
| 1 | 0 | 1 | 1 | 1 | 1 | 1 | 0 |
| 1 | 1 | 0 | 0 | 0 | 0 | 0 | 0 |
| 1 | 1 | 0 | 0 | 0 | 0 | 1 | 0 |
| 1 | 1 | 0 | 0 | 0 | 1 | 0 | 0 |
| 1 | 1 | 0 | 0 | 0 | 1 | 1 | 0 |
| 1 | 1 | 0 | 0 | 1 | 0 | 0 | 0 |
| 1 | 1 | 0 | 0 | 1 | 0 | 1 | 0 |
| 1 | 1 | 0 | 0 | 1 | 1 | 0 | 0 |
| 1 | 1 | 0 | 0 | 1 | 1 | 1 | 0 |
| 1 | 1 | 0 | 1 | 0 | 0 | 0 | 0 |
| 1 | 1 | 0 | 1 | 0 | 0 | 1 | 0 |
| 1 | 1 | 0 | 1 | 0 | 1 | 0 | 0 |
| 1 | 1 | 0 | 1 | 0 | 1 | 1 | 0 |
| 1 | 1 | 0 | 1 | 1 | 0 | 0 | 0 |
| 1 | 1 | 0 | 1 | 1 | 0 | 1 | 0 |
| 1 | 1 | 0 | 1 | 1 | 1 | 0 | 0 |
| 1 | 1 | 0 | 1 | 1 | 1 | 1 | 0 |
| 1 | 1 | 1 | 0 | 0 | 0 | 0 | 0 |
| 1 | 1 | 1 | 0 | 0 | 0 | 1 | 0 |
| 1 | 1 | 1 | 0 | 0 | 1 | 0 | 0 |
| 1 | 1 | 1 | 0 | 0 | 1 | 1 | 0 |
| 1 | 1 | 1 | 0 | 1 | 0 | 0 | 0 |
| 1 | 1 | 1 | 0 | 1 | 0 | 1 | 0 |
| 1 | 1 | 1 | 0 | 1 | 1 | 0 | 0 |
| 1 | 1 | 1 | 0 | 1 | 1 | 1 | 0 |
| 1 | 1 | 1 | 1 | 0 | 0 | 0 | 0 |
| 1 | 1 | 1 | 1 | 0 | 0 | 1 | 0 |
| 1 | 1 | 1 | 1 | 0 | 1 | 0 | 0 |
| 1 | 1 | 1 | 1 | 0 | 1 | 1 | 0 |
| 1 | 1 | 1 | 1 | 1 | 0 | 0 | 0 |
| 1 | 1 | 1 | 1 | 1 | 0 | 1 | 0 |
| 1 | 1 | 1 | 1 | 1 | 1 | 0 | 0 |
| 1 | 1 | 1 | 1 | 1 | 1 | 1 | 0 |

| Width: (W) Bus 244 signals | | | |
|---|---|---|---|
| 2 | 1 | 0 | Width |
| 0 | 0 | 0 | 0 |
| 0 | 0 | 1 | 1 |
| 0 | 1 | 0 | 2 |
| 0 | 1 | 1 | 4 |
| 1 | 0 | 0 | 8 |
| 1 | 0 | 1 | 16 |

-continued

| | | | | | | | |
|---|---|---|---|---|---|---|---|
| 1 | | 1 | | 0 | | 32 | |
| 1 | | 1 | | 1 | | 64 | |

Start Position;
(specified in seven bit, two's complement format)
(T) Bus 180 signals

| 6 | 5 | 4 | 3 | 2 | 1 | 0 | Start Position |
|---|---|---|---|---|---|---|---|
| 0 | 0 | 0 | 0 | 0 | 0 | 0 | 0 |
| 0 | 0 | 0 | 0 | 0 | 0 | 1 | 1 |
| 0 | 0 | 0 | 0 | 0 | 1 | 0 | 2 |
| 0 | 0 | 0 | 0 | 0 | 1 | 1 | 3 |
| 0 | 0 | 0 | 0 | 1 | 0 | 0 | 4 |
| 0 | 0 | 0 | 0 | 1 | 0 | 1 | 5 |
| 0 | 0 | 0 | 0 | 1 | 1 | 0 | 6 |
| 0 | 0 | 0 | 0 | 1 | 1 | 1 | 7 |
| 0 | 0 | 0 | 1 | 0 | 0 | 0 | 8 |
| 0 | 0 | 0 | 1 | 0 | 0 | 1 | 9 |
| 0 | 0 | 0 | 1 | 0 | 1 | 0 | 10 |
| 0 | 0 | 0 | 1 | 0 | 1 | 1 | 11 |
| 0 | 0 | 0 | 1 | 1 | 0 | 0 | 12 |
| 0 | 0 | 0 | 1 | 1 | 0 | 1 | 13 |
| 0 | 0 | 0 | 1 | 1 | 1 | 0 | 14 |
| 0 | 0 | 0 | 1 | 1 | 1 | 1 | 15 |
| 0 | 0 | 1 | 0 | 0 | 0 | 0 | 16 |
| 0 | 0 | 1 | 0 | 0 | 0 | 1 | 17 |
| 0 | 0 | 1 | 0 | 0 | 1 | 0 | 18 |
| 0 | 0 | 1 | 0 | 0 | 1 | 1 | 19 |
| 0 | 0 | 1 | 0 | 1 | 0 | 0 | 20 |
| 0 | 0 | 1 | 0 | 1 | 0 | 1 | 21 |
| 0 | 0 | 1 | 0 | 1 | 1 | 0 | 22 |
| 0 | 0 | 1 | 0 | 1 | 1 | 1 | 23 |
| 0 | 0 | 1 | 1 | 0 | 0 | 0 | 24 |
| 0 | 0 | 1 | 1 | 0 | 0 | 1 | 25 |
| 0 | 0 | 1 | 1 | 0 | 1 | 0 | 26 |
| 0 | 0 | 1 | 1 | 0 | 1 | 1 | 27 |
| 0 | 0 | 1 | 1 | 1 | 0 | 0 | 28 |
| 0 | 0 | 1 | 1 | 1 | 0 | 1 | 29 |
| 0 | 0 | 1 | 1 | 1 | 1 | 0 | 30 |
| 0 | 0 | 1 | 1 | 1 | 1 | 1 | 31 |
| 0 | 1 | 0 | 0 | 0 | 0 | 0 | 32 |
| 0 | 1 | 0 | 0 | 0 | 0 | 1 | 33 |
| 0 | 1 | 0 | 0 | 0 | 1 | 0 | 34 |
| 0 | 1 | 0 | 0 | 0 | 1 | 1 | 35 |
| 0 | 1 | 0 | 0 | 1 | 0 | 0 | 36 |
| 0 | 1 | 0 | 0 | 1 | 0 | 1 | 37 |
| 0 | 1 | 0 | 0 | 1 | 1 | 0 | 38 |
| 0 | 1 | 0 | 0 | 1 | 1 | 1 | 39 |
| 0 | 1 | 0 | 1 | 0 | 0 | 0 | 40 |
| 0 | 1 | 0 | 1 | 0 | 0 | 1 | 41 |
| 0 | 1 | 0 | 1 | 0 | 1 | 0 | 42 |
| 0 | 1 | 0 | 1 | 0 | 1 | 1 | 43 |
| 0 | 1 | 0 | 1 | 1 | 0 | 0 | 44 |
| 0 | 1 | 0 | 1 | 1 | 0 | 1 | 45 |
| 0 | 1 | 0 | 1 | 1 | 1 | 0 | 46 |
| 0 | 1 | 0 | 1 | 1 | 1 | 1 | 47 |
| 0 | 1 | 1 | 0 | 0 | 0 | 0 | 48 |
| 0 | 1 | 1 | 0 | 0 | 0 | 1 | 49 |
| 0 | 1 | 1 | 0 | 0 | 1 | 0 | 50 |
| 0 | 1 | 1 | 0 | 0 | 1 | 1 | 51 |
| 0 | 1 | 1 | 0 | 1 | 0 | 0 | 52 |
| 0 | 1 | 1 | 0 | 1 | 0 | 1 | 53 |
| 0 | 1 | 1 | 0 | 1 | 1 | 0 | 54 |
| 0 | 1 | 1 | 0 | 1 | 1 | 1 | 55 |
| 0 | 1 | 1 | 1 | 0 | 0 | 0 | 56 |
| 0 | 1 | 1 | 1 | 0 | 0 | 1 | 57 |
| 0 | 1 | 1 | 1 | 0 | 1 | 0 | 58 |
| 0 | 1 | 1 | 1 | 0 | 1 | 1 | 59 |
| 0 | 1 | 1 | 1 | 1 | 0 | 0 | 60 |
| 0 | 1 | 1 | 1 | 1 | 0 | 1 | 61 |
| 0 | 1 | 1 | 1 | 1 | 1 | 0 | 62 |
| 0 | 1 | 1 | 1 | 1 | 1 | 1 | 63 |
| 1 | 0 | 0 | 0 | 0 | 0 | 0 | 0 |
| 1 | 0 | 0 | 0 | 0 | 0 | 1 | 0 |
| 1 | 0 | 0 | 0 | 0 | 1 | 0 | 0 |
| 1 | 0 | 0 | 0 | 0 | 1 | 1 | 0 |
| 1 | 0 | 0 | 0 | 1 | 0 | 0 | 0 |
| 1 | 0 | 0 | 0 | 1 | 0 | 1 | 0 |
| 1 | 0 | 0 | 0 | 1 | 1 | 0 | 0 |
| 1 | 0 | 0 | 0 | 1 | 1 | 1 | 0 |
| 1 | 0 | 0 | 1 | 0 | 0 | 0 | 0 |
| 1 | 0 | 0 | 1 | 0 | 0 | 1 | 0 |
| 1 | 0 | 0 | 1 | 0 | 1 | 0 | 0 |

-continued

| | | | | | | | |
|---|---|---|---|---|---|---|---|
| 1 | 0 | 0 | 1 | 0 | 1 | 1 | 0 |
| 1 | 0 | 0 | 1 | 1 | 0 | 0 | 0 |
| 1 | 0 | 0 | 1 | 1 | 0 | 1 | 0 |
| 1 | 0 | 0 | 1 | 1 | 1 | 0 | 0 |
| 1 | 0 | 0 | 1 | 1 | 1 | 1 | 0 |
| 1 | 0 | 1 | 0 | 0 | 0 | 0 | 0 |
| 1 | 0 | 1 | 0 | 0 | 0 | 1 | 0 |
| 1 | 0 | 1 | 0 | 0 | 1 | 0 | 0 |
| 1 | 0 | 1 | 0 | 0 | 1 | 1 | 0 |
| 1 | 0 | 1 | 0 | 1 | 0 | 0 | 0 |
| 1 | 0 | 1 | 0 | 1 | 0 | 1 | 0 |
| 1 | 0 | 1 | 0 | 1 | 1 | 0 | 0 |
| 1 | 0 | 1 | 0 | 1 | 1 | 1 | 0 |
| 1 | 0 | 1 | 1 | 0 | 0 | 0 | 0 |
| 1 | 0 | 1 | 1 | 0 | 0 | 1 | 0 |
| 1 | 0 | 1 | 1 | 0 | 1 | 0 | 0 |
| 1 | 0 | 1 | 1 | 0 | 1 | 1 | 0 |
| 1 | 0 | 1 | 1 | 1 | 0 | 0 | 0 |
| 1 | 0 | 1 | 1 | 1 | 0 | 1 | 0 |
| 1 | 0 | 1 | 1 | 1 | 1 | 0 | 0 |
| 1 | 0 | 1 | 1 | 1 | 1 | 1 | 0 |
| 1 | 1 | 0 | 0 | 0 | 0 | 0 | 0 |
| 1 | 1 | 0 | 0 | 0 | 0 | 1 | 0 |
| 1 | 1 | 0 | 0 | 0 | 1 | 0 | 0 |
| 1 | 1 | 0 | 0 | 0 | 1 | 1 | 0 |
| 1 | 1 | 0 | 0 | 1 | 0 | 0 | 0 |
| 1 | 1 | 0 | 0 | 1 | 0 | 1 | 0 |
| 1 | 1 | 0 | 0 | 1 | 1 | 0 | 0 |
| 1 | 1 | 0 | 0 | 1 | 1 | 1 | 0 |
| 1 | 1 | 0 | 1 | 0 | 0 | 0 | 0 |
| 1 | 1 | 0 | 1 | 0 | 0 | 1 | 0 |
| 1 | 1 | 0 | 1 | 0 | 1 | 0 | 0 |
| 1 | 1 | 0 | 1 | 0 | 1 | 1 | 0 |
| 1 | 1 | 0 | 1 | 1 | 0 | 0 | 0 |
| 1 | 1 | 0 | 1 | 1 | 0 | 1 | 0 |
| 1 | 1 | 0 | 1 | 1 | 1 | 0 | 0 |
| 1 | 1 | 0 | 1 | 1 | 1 | 1 | 0 |
| 1 | 1 | 1 | 0 | 0 | 0 | 0 | 0 |
| 1 | 1 | 1 | 0 | 0 | 0 | 1 | 0 |
| 1 | 1 | 1 | 0 | 0 | 1 | 0 | 0 |
| 1 | 1 | 1 | 0 | 0 | 1 | 1 | 0 |
| 1 | 1 | 1 | 0 | 1 | 0 | 0 | 0 |
| 1 | 1 | 1 | 0 | 1 | 0 | 1 | 0 |
| 1 | 1 | 1 | 0 | 1 | 1 | 0 | 0 |
| 1 | 1 | 1 | 0 | 1 | 1 | 1 | 0 |
| 1 | 1 | 1 | 1 | 0 | 0 | 0 | 0 |
| 1 | 1 | 1 | 1 | 0 | 0 | 1 | 0 |
| 1 | 1 | 1 | 1 | 0 | 1 | 0 | 0 |
| 1 | 1 | 1 | 1 | 0 | 1 | 1 | 0 |
| 1 | 1 | 1 | 1 | 1 | 0 | 0 | 0 |
| 1 | 1 | 1 | 1 | 1 | 0 | 1 | 0 |
| 1 | 1 | 1 | 1 | 1 | 1 | 0 | 0 |
| 1 | 1 | 1 | 1 | 1 | 1 | 1 | 0 |

Width:
(Q) Bus 284 signals

| 5 | 4 | 3 | 2 | 1 | 0 | Width |
|---|---|---|---|---|---|---|
| 0 | 0 | 0 | 0 | 0 | 0 | 0 |
| 0 | 0 | 0 | 0 | 0 | 1 | 1 |
| 0 | 0 | 0 | 0 | 1 | 0 | 2 |
| 0 | 0 | 0 | 0 | 1 | 1 | 3 |
| 0 | 0 | 0 | 1 | 0 | 0 | 4 |
| 0 | 0 | 0 | 1 | 0 | 1 | 5 |
| 0 | 0 | 0 | 1 | 1 | 0 | 6 |
| 0 | 0 | 0 | 1 | 1 | 1 | 7 |
| 0 | 0 | 1 | 0 | 0 | 0 | 8 |
| 0 | 0 | 1 | 0 | 0 | 1 | 9 |
| 0 | 0 | 1 | 0 | 1 | 0 | 10 |
| 0 | 0 | 1 | 0 | 1 | 1 | 11 |
| 0 | 0 | 1 | 1 | 0 | 0 | 12 |
| 0 | 0 | 1 | 1 | 0 | 1 | 13 |
| 0 | 0 | 1 | 1 | 1 | 0 | 14 |
| 0 | 0 | 1 | 1 | 1 | 1 | 15 |
| 0 | 1 | 0 | 0 | 0 | 0 | 16 |
| 0 | 1 | 0 | 0 | 0 | 1 | 17 |
| 0 | 1 | 0 | 0 | 1 | 0 | 18 |
| 0 | 1 | 0 | 0 | 1 | 1 | 19 |
| 0 | 1 | 0 | 1 | 0 | 0 | 20 |
| 0 | 1 | 0 | 1 | 0 | 1 | 21 |
| 0 | 1 | 0 | 1 | 1 | 0 | 22 |
| 0 | 1 | 0 | 1 | 1 | 1 | 23 |
| 0 | 1 | 1 | 0 | 0 | 0 | 24 |

| | | | | | | |
|---|---|---|---|---|---|---|
| 0 | 1 | 1 | 0 | 0 | 1 | 25 |
| 0 | 1 | 1 | 0 | 1 | 0 | 26 |
| 0 | 1 | 1 | 0 | 1 | 1 | 27 |
| 0 | 1 | 1 | 1 | 0 | 0 | 28 |
| 0 | 1 | 1 | 1 | 0 | 1 | 29 |
| 0 | 1 | 1 | 1 | 1 | 0 | 30 |
| 0 | 1 | 1 | 1 | 1 | 1 | 31 |
| 1 | 0 | 0 | 0 | 0 | 0 | 32 |
| 1 | 0 | 0 | 0 | 0 | 1 | 33 |
| 1 | 0 | 0 | 0 | 1 | 0 | 34 |
| 1 | 0 | 0 | 0 | 1 | 1 | 35 |
| 1 | 0 | 0 | 1 | 0 | 0 | 36 |
| 1 | 0 | 0 | 1 | 0 | 1 | 37 |
| 1 | 0 | 0 | 1 | 1 | 0 | 38 |
| 1 | 0 | 0 | 1 | 1 | 1 | 39 |
| 1 | 0 | 1 | 0 | 0 | 0 | 40 |
| 1 | 0 | 1 | 0 | 0 | 1 | 41 |
| 1 | 0 | 1 | 0 | 1 | 0 | 42 |
| 1 | 0 | 1 | 0 | 1 | 1 | 43 |
| 1 | 0 | 1 | 1 | 0 | 0 | 44 |
| 1 | 0 | 1 | 1 | 0 | 1 | 45 |
| 1 | 0 | 1 | 1 | 1 | 0 | 46 |
| 1 | 0 | 1 | 1 | 1 | 1 | 47 |
| 1 | 1 | 0 | 0 | 0 | 0 | 48 |
| 1 | 1 | 0 | 0 | 0 | 1 | 49 |
| 1 | 1 | 0 | 0 | 1 | 0 | 50 |
| 1 | 1 | 0 | 0 | 1 | 1 | 51 |
| 1 | 1 | 0 | 1 | 0 | 0 | 52 |
| 1 | 1 | 0 | 1 | 0 | 1 | 53 |
| 1 | 1 | 0 | 1 | 1 | 0 | 54 |
| 1 | 1 | 0 | 1 | 1 | 1 | 55 |
| 1 | 1 | 1 | 0 | 0 | 0 | 56 |
| 1 | 1 | 1 | 0 | 0 | 1 | 57 |
| 1 | 1 | 1 | 0 | 1 | 0 | 58 |
| 1 | 1 | 1 | 0 | 1 | 1 | 59 |
| 1 | 1 | 1 | 1 | 0 | 0 | 60 |
| 1 | 1 | 1 | 1 | 0 | 1 | 61 |
| 1 | 1 | 1 | 1 | 1 | 0 | 62 |
| 1 | 1 | 1 | 1 | 1 | 1 | 63 |

Start Position Bar Graph Table:

| SP6 | SP5 | SP4 | SP3 | SP2 | SP1 | SP0 | Output in Hex. Format |||||||||||||||||
|---|---|---|---|---|---|---|---|---|---|---|---|---|---|---|---|---|---|---|---|---|---|---|
| 0 | 0 | 0 | 0 | 0 | 0 | 0 | F | F | F | F | F | F | F | F | F | F | F | F | F | F | F | F |
| 0 | 0 | 0 | 0 | 0 | 0 | 1 | F | F | F | F | F | F | F | F | F | F | F | F | F | F | F | E |
| 0 | 0 | 0 | 0 | 0 | 1 | 0 | F | F | F | F | F | F | F | F | F | F | F | F | F | F | F | C |
| 0 | 0 | 0 | 0 | 0 | 1 | 1 | F | F | F | F | F | F | F | F | F | F | F | F | F | F | F | 8 |
| 0 | 0 | 0 | 0 | 1 | 0 | 0 | F | F | F | F | F | F | F | F | F | F | F | F | F | F | F | 0 |
| 0 | 0 | 0 | 0 | 1 | 0 | 1 | F | F | F | F | F | F | F | F | F | F | F | F | F | F | E | 0 |
| 0 | 0 | 0 | 0 | 1 | 1 | 0 | F | F | F | F | F | F | F | F | F | F | F | F | F | F | C | 0 |
| 0 | 0 | 0 | 0 | 1 | 1 | 1 | F | F | F | F | F | F | F | F | F | F | F | F | F | F | 8 | 0 |
| 0 | 0 | 0 | 1 | 0 | 0 | 0 | F | F | F | F | F | F | F | F | F | F | F | F | F | F | 0 | 0 |
| 0 | 0 | 0 | 1 | 0 | 0 | 1 | F | F | F | F | F | F | F | F | F | F | F | F | F | E | 0 | 0 |
| 0 | 0 | 0 | 1 | 0 | 1 | 0 | F | F | F | F | F | F | F | F | F | F | F | F | F | C | 0 | 0 |
| 0 | 0 | 0 | 1 | 0 | 1 | 1 | F | F | F | F | F | F | F | F | F | F | F | F | F | 8 | 0 | 0 |
| 0 | 0 | 0 | 1 | 1 | 0 | 0 | F | F | F | F | F | F | F | F | F | F | F | F | F | 0 | 0 | 0 |
| 0 | 0 | 0 | 1 | 1 | 0 | 1 | F | F | F | F | F | F | F | F | F | F | F | F | E | 0 | 0 | 0 |
| 0 | 0 | 0 | 1 | 1 | 1 | 0 | F | F | F | F | F | F | F | F | F | F | F | F | C | 0 | 0 | 0 |
| 0 | 0 | 0 | 1 | 1 | 1 | 1 | F | F | F | F | F | F | F | F | F | F | F | F | 8 | 0 | 0 | 0 |
| 0 | 0 | 1 | 0 | 0 | 0 | 0 | F | F | F | F | F | F | F | F | F | F | F | F | 0 | 0 | 0 | 0 |
| 0 | 0 | 1 | 0 | 0 | 0 | 1 | F | F | F | F | F | F | F | F | F | F | F | E | 0 | 0 | 0 | 0 |
| 0 | 0 | 1 | 0 | 0 | 1 | 0 | F | F | F | F | F | F | F | F | F | F | F | C | 0 | 0 | 0 | 0 |
| 0 | 0 | 1 | 0 | 0 | 1 | 1 | F | F | F | F | F | F | F | F | F | F | F | 8 | 0 | 0 | 0 | 0 |
| 0 | 0 | 1 | 0 | 1 | 0 | 0 | F | F | F | F | F | F | F | F | F | F | F | 0 | 0 | 0 | 0 | 0 |
| 0 | 0 | 1 | 0 | 1 | 0 | 1 | F | F | F | F | F | F | F | F | F | F | E | 0 | 0 | 0 | 0 | 0 |
| 0 | 0 | 1 | 0 | 1 | 1 | 0 | F | F | F | F | F | F | F | F | F | F | C | 0 | 0 | 0 | 0 | 0 |
| 0 | 0 | 1 | 0 | 1 | 1 | 1 | F | F | F | F | F | F | F | F | F | F | 8 | 0 | 0 | 0 | 0 | 0 |
| 0 | 0 | 1 | 1 | 0 | 0 | 0 | F | F | F | F | F | F | F | F | F | F | 0 | 0 | 0 | 0 | 0 | 0 |
| 0 | 0 | 1 | 1 | 0 | 0 | 1 | F | F | F | F | F | F | F | F | F | E | 0 | 0 | 0 | 0 | 0 | 0 |
| 0 | 0 | 1 | 1 | 0 | 1 | 0 | F | F | F | F | F | F | F | F | F | C | 0 | 0 | 0 | 0 | 0 | 0 |
| 0 | 0 | 1 | 1 | 0 | 1 | 1 | F | F | F | F | F | F | F | F | F | 8 | 0 | 0 | 0 | 0 | 0 | 0 |
| 0 | 0 | 1 | 1 | 1 | 0 | 0 | F | F | F | F | F | F | F | F | F | 0 | 0 | 0 | 0 | 0 | 0 | 0 |
| 0 | 0 | 1 | 1 | 1 | 0 | 1 | F | F | F | F | F | F | F | F | E | 0 | 0 | 0 | 0 | 0 | 0 | 0 |
| 0 | 0 | 1 | 1 | 1 | 1 | 0 | F | F | F | F | F | F | F | F | C | 0 | 0 | 0 | 0 | 0 | 0 | 0 |
| 0 | 0 | 1 | 1 | 1 | 1 | 1 | F | F | F | F | F | F | F | F | 8 | 0 | 0 | 0 | 0 | 0 | 0 | 0 |
| 0 | 1 | 0 | 0 | 0 | 0 | 0 | F | F | F | F | F | F | F | F | 0 | 0 | 0 | 0 | 0 | 0 | 0 | 0 |
| 0 | 1 | 0 | 0 | 0 | 0 | 1 | F | F | F | F | F | F | F | E | 0 | 0 | 0 | 0 | 0 | 0 | 0 | 0 |
| 0 | 1 | 0 | 0 | 0 | 1 | 0 | F | F | F | F | F | F | F | C | 0 | 0 | 0 | 0 | 0 | 0 | 0 | 0 |
| 0 | 1 | 0 | 0 | 0 | 1 | 1 | F | F | F | F | F | F | F | 8 | 0 | 0 | 0 | 0 | 0 | 0 | 0 | 0 |
| 0 | 1 | 0 | 0 | 1 | 0 | 0 | F | F | F | F | F | F | F | 0 | 0 | 0 | 0 | 0 | 0 | 0 | 0 | 0 |
| 0 | 1 | 0 | 0 | 1 | 0 | 1 | F | F | F | F | F | F | E | 0 | 0 | 0 | 0 | 0 | 0 | 0 | 0 | 0 |
| 0 | 1 | 0 | 0 | 1 | 1 | 0 | F | F | F | F | F | F | C | 0 | 0 | 0 | 0 | 0 | 0 | 0 | 0 | 0 |
| 0 | 1 | 0 | 0 | 1 | 1 | 1 | F | F | F | F | F | F | 8 | 0 | 0 | 0 | 0 | 0 | 0 | 0 | 0 | 0 |

| | | | | | | | | | | | | | | | | | | | | | | | |
|---|---|---|---|---|---|---|---|---|---|---|---|---|---|---|---|---|---|---|---|---|---|---|---|
| 0 | 1 | 0 | 1 | 0 | 0 | 0 | F | F | F | F | F | F | 0 | 0 | 0 | 0 | 0 | 0 | 0 | 0 | 0 | 0 | 0 |
| 0 | 1 | 0 | 1 | 0 | 0 | 1 | F | F | F | F | F | E | 0 | 0 | 0 | 0 | 0 | 0 | 0 | 0 | 0 | 0 | 0 |
| 0 | 1 | 0 | 1 | 0 | 1 | 0 | F | F | F | F | F | C | 0 | 0 | 0 | 0 | 0 | 0 | 0 | 0 | 0 | 0 | 0 |
| 0 | 1 | 0 | 1 | 0 | 1 | 1 | F | F | F | F | F | 8 | 0 | 0 | 0 | 0 | 0 | 0 | 0 | 0 | 0 | 0 | 0 |
| 0 | 1 | 0 | 1 | 1 | 0 | 0 | F | F | F | F | F | 0 | 0 | 0 | 0 | 0 | 0 | 0 | 0 | 0 | 0 | 0 | 0 |
| 0 | 1 | 0 | 1 | 1 | 0 | 1 | F | F | F | F | E | 0 | 0 | 0 | 0 | 0 | 0 | 0 | 0 | 0 | 0 | 0 | 0 |
| 0 | 1 | 0 | 1 | 1 | 1 | 0 | F | F | F | F | C | 0 | 0 | 0 | 0 | 0 | 0 | 0 | 0 | 0 | 0 | 0 | 0 |
| 0 | 1 | 0 | 1 | 1 | 1 | 1 | F | F | F | F | 8 | 0 | 0 | 0 | 0 | 0 | 0 | 0 | 0 | 0 | 0 | 0 | 0 |
| 0 | 1 | 1 | 0 | 0 | 0 | 0 | F | F | F | F | 0 | 0 | 0 | 0 | 0 | 0 | 0 | 0 | 0 | 0 | 0 | 0 | 0 |
| 0 | 1 | 1 | 0 | 0 | 0 | 1 | F | F | F | E | 0 | 0 | 0 | 0 | 0 | 0 | 0 | 0 | 0 | 0 | 0 | 0 | 0 |
| 0 | 1 | 1 | 0 | 0 | 1 | 0 | F | F | F | C | 0 | 0 | 0 | 0 | 0 | 0 | 0 | 0 | 0 | 0 | 0 | 0 | 0 |
| 0 | 1 | 1 | 0 | 0 | 1 | 1 | F | F | F | 8 | 0 | 0 | 0 | 0 | 0 | 0 | 0 | 0 | 0 | 0 | 0 | 0 | 0 |
| 0 | 1 | 1 | 0 | 1 | 0 | 0 | F | F | F | 0 | 0 | 0 | 0 | 0 | 0 | 0 | 0 | 0 | 0 | 0 | 0 | 0 | 0 |
| 0 | 1 | 1 | 0 | 1 | 0 | 1 | F | F | E | 0 | 0 | 0 | 0 | 0 | 0 | 0 | 0 | 0 | 0 | 0 | 0 | 0 | 0 |
| 0 | 1 | 1 | 0 | 1 | 1 | 0 | F | F | C | 0 | 0 | 0 | 0 | 0 | 0 | 0 | 0 | 0 | 0 | 0 | 0 | 0 | 0 |
| 0 | 1 | 1 | 0 | 1 | 1 | 1 | F | F | 8 | 0 | 0 | 0 | 0 | 0 | 0 | 0 | 0 | 0 | 0 | 0 | 0 | 0 | 0 |
| 0 | 1 | 1 | 1 | 0 | 0 | 0 | F | F | 0 | 0 | 0 | 0 | 0 | 0 | 0 | 0 | 0 | 0 | 0 | 0 | 0 | 0 | 0 |
| 0 | 1 | 1 | 1 | 0 | 0 | 1 | F | E | 0 | 0 | 0 | 0 | 0 | 0 | 0 | 0 | 0 | 0 | 0 | 0 | 0 | 0 | 0 |
| 0 | 1 | 1 | 1 | 0 | 1 | 0 | F | C | 0 | 0 | 0 | 0 | 0 | 0 | 0 | 0 | 0 | 0 | 0 | 0 | 0 | 0 | 0 |
| 0 | 1 | 1 | 1 | 0 | 1 | 1 | F | 8 | 0 | 0 | 0 | 0 | 0 | 0 | 0 | 0 | 0 | 0 | 0 | 0 | 0 | 0 | 0 |
| 0 | 1 | 1 | 1 | 1 | 0 | 0 | F | 0 | 0 | 0 | 0 | 0 | 0 | 0 | 0 | 0 | 0 | 0 | 0 | 0 | 0 | 0 | 0 |
| 0 | 1 | 1 | 1 | 1 | 0 | 1 | E | 0 | 0 | 0 | 0 | 0 | 0 | 0 | 0 | 0 | 0 | 0 | 0 | 0 | 0 | 0 | 0 |
| 0 | 1 | 1 | 1 | 1 | 1 | 0 | C | 0 | 0 | 0 | 0 | 0 | 0 | 0 | 0 | 0 | 0 | 0 | 0 | 0 | 0 | 0 | 0 |
| 0 | 1 | 1 | 1 | 1 | 1 | 1 | 8 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 1 | 1 | 0 | 0 | 0 | 0 | 0 | 0 | 0 | 0 | 0 | 0 | 0 | 0 | 0 | 0 | 0 | 0 | 0 |
| 1 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 1 | 0 | 1 | 0 | 0 | 0 | 0 | 0 | 0 | 0 | 0 | 0 | 0 | 0 | 0 | 0 | 0 | 0 | 0 | 0 |
| 1 | 0 | 0 | 0 | 1 | 1 | 0 | 0 | 0 | 0 | 0 | 0 | 0 | 0 | 0 | 0 | 0 | 0 | 0 | 0 | 0 | 0 | 0 | 0 |
| 1 | 0 | 0 | 0 | 1 | 1 | 1 | 0 | 0 | 0 | 0 | 0 | 0 | 0 | 0 | 0 | 0 | 0 | 0 | 0 | 0 | 0 | 0 | 0 |
| 1 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 1 | 0 | 0 | 1 | 0 | 0 | 0 | 0 | 0 | 0 | 0 | 0 | 0 | 0 | 0 | 0 | 0 | 0 | 0 | 0 | 0 |
| 1 | 0 | 0 | 1 | 0 | 1 | 0 | 0 | 0 | 0 | 0 | 0 | 0 | 0 | 0 | 0 | 0 | 0 | 0 | 0 | 0 | 0 | 0 | 0 |
| 1 | 0 | 0 | 1 | 0 | 1 | 1 | 0 | 0 | 0 | 0 | 0 | 0 | 0 | 0 | 0 | 0 | 0 | 0 | 0 | 0 | 0 | 0 | 0 |
| 1 | 0 | 0 | 1 | 1 | 0 | 0 | 0 | 0 | 0 | 0 | 0 | 0 | 0 | 0 | 0 | 0 | 0 | 0 | 0 | 0 | 0 | 0 | 0 |
| 1 | 0 | 0 | 1 | 1 | 0 | 1 | 0 | 0 | 0 | 0 | 0 | 0 | 0 | 0 | 0 | 0 | 0 | 0 | 0 | 0 | 0 | 0 | 0 |
| 1 | 0 | 0 | 1 | 1 | 1 | 0 | 0 | 0 | 0 | 0 | 0 | 0 | 0 | 0 | 0 | 0 | 0 | 0 | 0 | 0 | 0 | 0 | 0 |
| 1 | 0 | 0 | 1 | 1 | 1 | 1 | 0 | 0 | 0 | 0 | 0 | 0 | 0 | 0 | 0 | 0 | 0 | 0 | 0 | 0 | 0 | 0 | 0 |
| 1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 1 | 0 | 0 | 0 | 1 | 0 | 0 | 0 | 0 | 0 | 0 | 0 | 0 | 0 | 0 | 0 | 0 | 0 | 0 | 0 | 0 | 0 |
| 1 | 0 | 1 | 0 | 0 | 1 | 0 | 0 | 0 | 0 | 0 | 0 | 0 | 0 | 0 | 0 | 0 | 0 | 0 | 0 | 0 | 0 | 0 | 0 |
| 1 | 0 | 1 | 0 | 0 | 1 | 1 | 0 | 0 | 0 | 0 | 0 | 0 | 0 | 0 | 0 | 0 | 0 | 0 | 0 | 0 | 0 | 0 | 0 |
| 1 | 0 | 1 | 0 | 1 | 0 | 0 | 0 | 0 | 0 | 0 | 0 | 0 | 0 | 0 | 0 | 0 | 0 | 0 | 0 | 0 | 0 | 0 | 0 |
| 1 | 0 | 1 | 0 | 1 | 0 | 1 | 0 | 0 | 0 | 0 | 0 | 0 | 0 | 0 | 0 | 0 | 0 | 0 | 0 | 0 | 0 | 0 | 0 |
| 1 | 0 | 1 | 0 | 1 | 1 | 0 | 0 | 0 | 0 | 0 | 0 | 0 | 0 | 0 | 0 | 0 | 0 | 0 | 0 | 0 | 0 | 0 | 0 |
| 1 | 0 | 1 | 0 | 1 | 1 | 1 | 0 | 0 | 0 | 0 | 0 | 0 | 0 | 0 | 0 | 0 | 0 | 0 | 0 | 0 | 0 | 0 | 0 |
| 1 | 0 | 1 | 1 | 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 1 | 1 | 0 | 0 | 1 | 0 | 0 | 0 | 0 | 0 | 0 | 0 | 0 | 0 | 0 | 0 | 0 | 0 | 0 | 0 | 0 | 0 |
| 1 | 0 | 1 | 1 | 0 | 1 | 0 | 0 | 0 | 0 | 0 | 0 | 0 | 0 | 0 | 0 | 0 | 0 | 0 | 0 | 0 | 0 | 0 | 0 |
| 1 | 0 | 1 | 1 | 0 | 1 | 1 | 0 | 0 | 0 | 0 | 0 | 0 | 0 | 0 | 0 | 0 | 0 | 0 | 0 | 0 | 0 | 0 | 0 |
| 1 | 0 | 1 | 1 | 1 | 0 | 0 | 0 | 0 | 0 | 0 | 0 | 0 | 0 | 0 | 0 | 0 | 0 | 0 | 0 | 0 | 0 | 0 | 0 |
| 1 | 0 | 1 | 1 | 1 | 0 | 1 | 0 | 0 | 0 | 0 | 0 | 0 | 0 | 0 | 0 | 0 | 0 | 0 | 0 | 0 | 0 | 0 | 0 |
| 1 | 0 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 1 | 0 | 1 | 1 | 1 | 1 | 1 | 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 0 | 1 | 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 1 | 0 | 0 | 0 | 0 | 0 | 0 | 0 | 0 | 0 | 0 | 0 | 0 | 0 | 0 | 0 | 0 | 0 | 0 |
| 1 | 1 | 0 | 0 | 0 | 1 | 1 | 0 | 0 | 0 | 0 | 0 | 0 | 0 | 0 | 0 | 0 | 0 | 0 | 0 | 0 | 0 | 0 | 0 |
| 1 | 1 | 0 | 0 | 1 | 0 | 0 | 0 | 0 | 0 | 0 | 0 | 0 | 0 | 0 | 0 | 0 | 0 | 0 | 0 | 0 | 0 | 0 | 0 |
| 1 | 1 | 0 | 0 | 1 | 0 | 1 | 0 | 0 | 0 | 0 | 0 | 0 | 0 | 0 | 0 | 0 | 0 | 0 | 0 | 0 | 0 | 0 | 0 |
| 1 | 1 | 0 | 0 | 1 | 1 | 0 | 0 | 0 | 0 | 0 | 0 | 0 | 0 | 0 | 0 | 0 | 0 | 0 | 0 | 0 | 0 | 0 | 0 |
| 1 | 1 | 0 | 0 | 1 | 1 | 1 | 0 | 0 | 0 | 0 | 0 | 0 | 0 | 0 | 0 | 0 | 0 | 0 | 0 | 0 | 0 | 0 | 0 |
| 1 | 1 | 0 | 1 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 0 | 1 | 0 | 0 | 1 | 0 | 0 | 0 | 0 | 0 | 0 | 0 | 0 | 0 | 0 | 0 | 0 | 0 | 0 | 0 | 0 | 0 |
| 1 | 1 | 0 | 1 | 0 | 1 | 0 | 0 | 0 | 0 | 0 | 0 | 0 | 0 | 0 | 0 | 0 | 0 | 0 | 0 | 0 | 0 | 0 | 0 |
| 1 | 1 | 0 | 1 | 0 | 1 | 1 | 0 | 0 | 0 | 0 | 0 | 0 | 0 | 0 | 0 | 0 | 0 | 0 | 0 | 0 | 0 | 0 | 0 |
| 1 | 1 | 0 | 1 | 1 | 0 | 0 | 0 | 0 | 0 | 0 | 0 | 0 | 0 | 0 | 0 | 0 | 0 | 0 | 0 | 0 | 0 | 0 | 0 |
| 1 | 1 | 0 | 1 | 1 | 0 | 1 | 0 | 0 | 0 | 0 | 0 | 0 | 0 | 0 | 0 | 0 | 0 | 0 | 0 | 0 | 0 | 0 | 0 |
| 1 | 1 | 0 | 1 | 1 | 1 | 0 | 0 | 0 | 0 | 0 | 0 | 0 | 0 | 0 | 0 | 0 | 0 | 0 | 0 | 0 | 0 | 0 | 0 |
| 1 | 1 | 0 | 1 | 1 | 1 | 1 | 0 | 0 | 0 | 0 | 0 | 0 | 0 | 0 | 0 | 0 | 0 | 0 | 0 | 0 | 0 | 0 | 0 |
| 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 0 | 0 | 0 | 1 | 0 | 0 | 0 | 0 | 0 | 0 | 0 | 0 | 0 | 0 | 0 | 0 | 0 | 0 | 0 | 0 | 0 |
| 1 | 1 | 1 | 0 | 0 | 1 | 0 | 0 | 0 | 0 | 0 | 0 | 0 | 0 | 0 | 0 | 0 | 0 | 0 | 0 | 0 | 0 | 0 | 0 |
| 1 | 1 | 1 | 0 | 0 | 1 | 1 | 0 | 0 | 0 | 0 | 0 | 0 | 0 | 0 | 0 | 0 | 0 | 0 | 0 | 0 | 0 | 0 | 0 |
| 1 | 1 | 1 | 0 | 1 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 0 | 1 | 0 | 1 | 0 | 0 | 0 | 0 | 0 | 0 | 0 | 0 | 0 | 0 | 0 | 0 | 0 | 0 | 0 | 0 | 0 |
| 1 | 1 | 1 | 0 | 1 | 1 | 0 | 0 | 0 | 0 | 0 | 0 | 0 | 0 | 0 | 0 | 0 | 0 | 0 | 0 | 0 | 0 | 0 | 0 |
| 1 | 1 | 1 | 0 | 1 | 1 | 1 | 0 | 0 | 0 | 0 | 0 | 0 | 0 | 0 | 0 | 0 | 0 | 0 | 0 | 0 | 0 | 0 | 0 |
| 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 0 | 0 | 1 | 0 | 0 | 0 | 0 | 0 | 0 | 0 | 0 | 0 | 0 | 0 | 0 | 0 | 0 | 0 | 0 | 0 |

| | | | | | | | | | | | | | | | | | | | | | | | |
|---|---|---|---|---|---|---|---|---|---|---|---|---|---|---|---|---|---|---|---|---|---|---|---|
| 1 | 1 | 1 | 1 | 0 | 1 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 0 | 1 | 1 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 0 | 1 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 | 0 |
| 1 | 1 | 1 | 1 | 1 | 1 | 1 | 0 | 0 | 0 | 0 | 0 | 0 | 0 | 0 | 0 | 0 | 0 | 0 | 0 | 0 | 0 | 0 | 0 |

Word Length Bar Graph Table:

| W16 | W15 | W14 | W13 | W12 | W11 | W10 | | | | | | | | | | | | | | | | | |
|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 | 0 | 0 | 0 | 0 | 0 | 0 | 0 | 1 |
| 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 3 |
| 0 | 0 | 0 | 0 | 0 | 1 | 1 | 0 | 0 | 0 | 0 | 0 | 0 | 0 | 0 | 0 | 0 | 0 | 0 | 0 | 0 | 0 | 0 | 7 |
| 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | F |
| 0 | 0 | 0 | 0 | 1 | 0 | 1 | 0 | 0 | 0 | 0 | 0 | 0 | 0 | 0 | 0 | 0 | 0 | 0 | 0 | 0 | 0 | 1 | F |
| 0 | 0 | 0 | 0 | 1 | 1 | 0 | 0 | 0 | 0 | 0 | 0 | 0 | 0 | 0 | 0 | 0 | 0 | 0 | 0 | 0 | 0 | 3 | F |
| 0 | 0 | 0 | 0 | 1 | 1 | 1 | 0 | 0 | 0 | 0 | 0 | 0 | 0 | 0 | 0 | 0 | 0 | 0 | 0 | 0 | 0 | 7 | F |
| 0 | 0 | 0 | 1 | 0 | 0 | 0 | 0 | 0 | 0 | 0 | 0 | 0 | 0 | 0 | 0 | 0 | 0 | 0 | 0 | 0 | F | F | F |
| 0 | 0 | 0 | 1 | 0 | 0 | 1 | 0 | 0 | 0 | 0 | 0 | 0 | 0 | 0 | 0 | 0 | 0 | 0 | 0 | 0 | 1 | F | F |
| 0 | 0 | 0 | 1 | 0 | 1 | 0 | 0 | 0 | 0 | 0 | 0 | 0 | 0 | 0 | 0 | 0 | 0 | 0 | 0 | 0 | 3 | F | F |
| 0 | 0 | 0 | 1 | 0 | 1 | 1 | 0 | 0 | 0 | 0 | 0 | 0 | 0 | 0 | 0 | 0 | 0 | 0 | 0 | 0 | 7 | F | F |
| 0 | 0 | 0 | 1 | 1 | 0 | 0 | 0 | 0 | 0 | 0 | 0 | 0 | 0 | 0 | 0 | 0 | 0 | 0 | 0 | 0 | F | F | F |
| 0 | 0 | 0 | 1 | 1 | 0 | 1 | 0 | 0 | 0 | 0 | 0 | 0 | 0 | 0 | 0 | 0 | 0 | 0 | 0 | 1 | F | F | F |
| 0 | 0 | 0 | 1 | 1 | 1 | 0 | 0 | 0 | 0 | 0 | 0 | 0 | 0 | 0 | 0 | 0 | 0 | 0 | 0 | 3 | F | F | F |
| 0 | 0 | 0 | 1 | 1 | 1 | 1 | 0 | 0 | 0 | 0 | 0 | 0 | 0 | 0 | 0 | 0 | 0 | 0 | 0 | 7 | F | F | F |
| 0 | 0 | 1 | 0 | 0 | 0 | 0 | 0 | 0 | 0 | 0 | 0 | 0 | 0 | 0 | 0 | 0 | 0 | 0 | F | F | F | F | F |
| 0 | 0 | 1 | 0 | 0 | 0 | 1 | 0 | 0 | 0 | 0 | 0 | 0 | 0 | 0 | 0 | 0 | 0 | 0 | 1 | F | F | F | F |
| 0 | 0 | 1 | 0 | 0 | 1 | 0 | 0 | 0 | 0 | 0 | 0 | 0 | 0 | 0 | 0 | 0 | 0 | 0 | 3 | F | F | F | F |
| 0 | 0 | 1 | 0 | 0 | 1 | 1 | 0 | 0 | 0 | 0 | 0 | 0 | 0 | 0 | 0 | 0 | 0 | 0 | 7 | F | F | F | F |
| 0 | 0 | 1 | 0 | 1 | 0 | 0 | 0 | 0 | 0 | 0 | 0 | 0 | 0 | 0 | 0 | 0 | 0 | F | F | F | F | F | F |
| 0 | 0 | 1 | 0 | 1 | 0 | 1 | 0 | 0 | 0 | 0 | 0 | 0 | 0 | 0 | 0 | 0 | 0 | 1 | F | F | F | F | F |
| 0 | 0 | 1 | 0 | 1 | 1 | 0 | 0 | 0 | 0 | 0 | 0 | 0 | 0 | 0 | 0 | 0 | 0 | 3 | F | F | F | F | F |
| 0 | 0 | 1 | 0 | 1 | 1 | 1 | 0 | 0 | 0 | 0 | 0 | 0 | 0 | 0 | 0 | 0 | 0 | 7 | F | F | F | F | F |
| 0 | 0 | 1 | 1 | 0 | 0 | 0 | 0 | 0 | 0 | 0 | 0 | 0 | 0 | 0 | 0 | 0 | F | F | F | F | F | F | F |
| 0 | 0 | 1 | 1 | 0 | 0 | 1 | 0 | 0 | 0 | 0 | 0 | 0 | 0 | 0 | 0 | 0 | 1 | F | F | F | F | F | F |
| 0 | 0 | 1 | 1 | 0 | 1 | 0 | 0 | 0 | 0 | 0 | 0 | 0 | 0 | 0 | 0 | 0 | 3 | F | F | F | F | F | F |
| 0 | 0 | 1 | 1 | 0 | 1 | 1 | 0 | 0 | 0 | 0 | 0 | 0 | 0 | 0 | 0 | 0 | 7 | F | F | F | F | F | F |
| 0 | 0 | 1 | 1 | 1 | 0 | 0 | 0 | 0 | 0 | 0 | 0 | 0 | 0 | 0 | 0 | F | F | F | F | F | F | F | F |
| 0 | 0 | 1 | 1 | 1 | 0 | 1 | 0 | 0 | 0 | 0 | 0 | 0 | 0 | 0 | 0 | 1 | F | F | F | F | F | F | F |
| 0 | 0 | 1 | 1 | 1 | 1 | 0 | 0 | 0 | 0 | 0 | 0 | 0 | 0 | 0 | 0 | 3 | F | F | F | F | F | F | F |
| 0 | 0 | 1 | 1 | 1 | 1 | 1 | 0 | 0 | 0 | 0 | 0 | 0 | 0 | 0 | 0 | 7 | F | F | F | F | F | F | F |
| 0 | 1 | 0 | 0 | 0 | 0 | 0 | 0 | 0 | 0 | 0 | 0 | 0 | 0 | 0 | F | F | F | F | F | F | F | F | F |
| 0 | 1 | 0 | 0 | 0 | 0 | 1 | 0 | 0 | 0 | 0 | 0 | 0 | 0 | 0 | 1 | F | F | F | F | F | F | F | F |
| 0 | 1 | 0 | 0 | 0 | 1 | 0 | 0 | 0 | 0 | 0 | 0 | 0 | 0 | 0 | 3 | F | F | F | F | F | F | F | F |
| 0 | 1 | 0 | 0 | 0 | 1 | 1 | 0 | 0 | 0 | 0 | 0 | 0 | 0 | 0 | 7 | F | F | F | F | F | F | F | F |
| 0 | 1 | 0 | 0 | 1 | 0 | 0 | 0 | 0 | 0 | 0 | 0 | 0 | 0 | F | F | F | F | F | F | F | F | F | F |
| 0 | 1 | 0 | 0 | 1 | 0 | 1 | 0 | 0 | 0 | 0 | 0 | 0 | 0 | 1 | F | F | F | F | F | F | F | F | F |
| 0 | 1 | 0 | 0 | 1 | 1 | 0 | 0 | 0 | 0 | 0 | 0 | 0 | 0 | 3 | F | F | F | F | F | F | F | F | F |
| 0 | 1 | 0 | 0 | 1 | 1 | 1 | 0 | 0 | 0 | 0 | 0 | 0 | 0 | 7 | F | F | F | F | F | F | F | F | F |
| 0 | 1 | 0 | 1 | 0 | 0 | 0 | 0 | 0 | 0 | 0 | 0 | 0 | F | F | F | F | F | F | F | F | F | F | F |
| 0 | 1 | 0 | 1 | 0 | 0 | 1 | 0 | 0 | 0 | 0 | 0 | 0 | 1 | F | F | F | F | F | F | F | F | F | F |
| 0 | 1 | 0 | 1 | 0 | 1 | 0 | 0 | 0 | 0 | 0 | 0 | 0 | 3 | F | F | F | F | F | F | F | F | F | F |
| 0 | 1 | 0 | 1 | 0 | 1 | 1 | 0 | 0 | 0 | 0 | 0 | 0 | 7 | F | F | F | F | F | F | F | F | F | F |
| 0 | 1 | 0 | 1 | 1 | 0 | 0 | 0 | 0 | 0 | 0 | 0 | F | F | F | F | F | F | F | F | F | F | F | F |
| 0 | 1 | 0 | 1 | 1 | 0 | 1 | 0 | 0 | 0 | 0 | 0 | 1 | F | F | F | F | F | F | F | F | F | F | F |
| 0 | 1 | 0 | 1 | 1 | 1 | 0 | 0 | 0 | 0 | 0 | 0 | 3 | F | F | F | F | F | F | F | F | F | F | F |
| 0 | 1 | 0 | 1 | 1 | 1 | 1 | 0 | 0 | 0 | 0 | 0 | 7 | F | F | F | F | F | F | F | F | F | F | F |
| 0 | 1 | 1 | 0 | 0 | 0 | 0 | 0 | 0 | 0 | 0 | F | F | F | F | F | F | F | F | F | F | F | F | F |
| 0 | 1 | 1 | 0 | 0 | 0 | 1 | 0 | 0 | 0 | 0 | 1 | F | F | F | F | F | F | F | F | F | F | F | F |
| 0 | 1 | 1 | 0 | 0 | 1 | 0 | 0 | 0 | 0 | 0 | 3 | F | F | F | F | F | F | F | F | F | F | F | F |
| 0 | 1 | 1 | 0 | 0 | 1 | 1 | 0 | 0 | 0 | 0 | 7 | F | F | F | F | F | F | F | F | F | F | F | F |
| 0 | 1 | 1 | 0 | 1 | 0 | 0 | 0 | 0 | 0 | F | F | F | F | F | F | F | F | F | F | F | F | F | F |
| 0 | 1 | 1 | 0 | 1 | 0 | 1 | 0 | 0 | 0 | 1 | F | F | F | F | F | F | F | F | F | F | F | F | F |
| 0 | 1 | 1 | 0 | 1 | 1 | 0 | 0 | 0 | 0 | 3 | F | F | F | F | F | F | F | F | F | F | F | F | F |
| 0 | 1 | 1 | 0 | 1 | 1 | 1 | 0 | 0 | 0 | 7 | F | F | F | F | F | F | F | F | F | F | F | F | F |
| 0 | 1 | 1 | 1 | 0 | 0 | 0 | 0 | 0 | F | F | F | F | F | F | F | F | F | F | F | F | F | F | F |
| 0 | 1 | 1 | 1 | 0 | 0 | 1 | 0 | 0 | 1 | F | F | F | F | F | F | F | F | F | F | F | F | F | F |
| 0 | 1 | 1 | 1 | 0 | 1 | 0 | 0 | 0 | 3 | F | F | F | F | F | F | F | F | F | F | F | F | F | F |
| 0 | 1 | 1 | 1 | 0 | 1 | 1 | 0 | 0 | 7 | F | F | F | F | F | F | F | F | F | F | F | F | F | F |
| 0 | 1 | 1 | 1 | 1 | 0 | 0 | 0 | F | F | F | F | F | F | F | F | F | F | F | F | F | F | F | F |
| 0 | 1 | 1 | 1 | 1 | 0 | 1 | 0 | 1 | F | F | F | F | F | F | F | F | F | F | F | F | F | F | F |
| 0 | 1 | 1 | 1 | 1 | 1 | 0 | 0 | 3 | F | F | F | F | F | F | F | F | F | F | F | F | F | F | F |
| 0 | 1 | 1 | 1 | 1 | 1 | 1 | 0 | 7 | F | F | F | F | F | F | F | F | F | F | F | F | F | F | F |
| 1 | 1 | 1 | 1 | 1 | 1 | 1 | F | F | F | F | F | F | F | F | F | F | F | F | F | F | F | F | F |

Word Length Bar Graph Table:

| Q5 | Q4 | Q3 | Q2 | Q1 | Q0 | | | | | | | | | | | | | | | | | | |
|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 | 0 | 0 | 0 | 0 | 0 | 0 | 0 | 1 |
| 0 | 0 | 0 | 0 | 1 | 0 | 0 | 0 | 0 | 0 | 0 | 0 | 0 | 0 | 0 | 0 | 0 | 0 | 0 | 0 | 0 | 0 | 0 | 3 |
| 0 | 0 | 0 | 0 | 1 | 1 | 0 | 0 | 0 | 0 | 0 | 0 | 0 | 0 | 0 | 0 | 0 | 0 | 0 | 0 | 0 | 0 | 0 | 7 |
| 0 | 0 | 0 | 1 | 0 | 0 | 0 | 0 | 0 | 0 | 0 | 0 | 0 | 0 | 0 | 0 | 0 | 0 | 0 | 0 | 0 | 0 | 0 | F |

-continued

```
0 0 0 1 0 1 0 0 0 0 0 0 0 0 0 0 0 0 0 0 1 F
0 0 0 1 1 0 0 0 0 0 0 0 0 0 0 0 0 0 0 0 3 F
0 0 0 1 1 1 0 0 0 0 0 0 0 0 0 0 0 0 0 0 7 F
0 0 1 0 0 0 0 0 0 0 0 0 0 0 0 0 0 0 0 0 F F
0 0 1 0 0 1 0 0 0 0 0 0 0 0 0 0 0 0 0 1 F F
0 0 1 0 1 0 0 0 0 0 0 0 0 0 0 0 0 0 0 3 F F
0 0 1 0 1 1 0 0 0 0 0 0 0 0 0 0 0 0 0 7 F F
0 0 1 1 0 0 0 0 0 0 0 0 0 0 0 0 0 0 0 F F F
0 0 1 1 0 1 0 0 0 0 0 0 0 0 0 0 0 0 1 F F F
0 0 1 1 1 0 0 0 0 0 0 0 0 0 0 0 0 0 3 F F F
0 0 1 1 1 1 0 0 0 0 0 0 0 0 0 0 0 0 7 F F F
0 1 0 0 0 0 0 0 0 0 0 0 0 0 0 0 0 0 F F F F
0 1 0 0 0 1 0 0 0 0 0 0 0 0 0 0 0 1 F F F F
0 1 0 0 1 0 0 0 0 0 0 0 0 0 0 0 0 3 F F F F
0 1 0 0 1 1 0 0 0 0 0 0 0 0 0 0 0 7 F F F F
0 1 0 1 0 0 0 0 0 0 0 0 0 0 0 0 0 F F F F F
0 1 0 1 0 1 0 0 0 0 0 0 0 0 0 0 1 F F F F F
0 1 0 1 1 0 0 0 0 0 0 0 0 0 0 0 3 F F F F F
0 1 0 1 1 1 0 0 0 0 0 0 0 0 0 0 7 F F F F F
0 1 1 0 0 0 0 0 0 0 0 0 0 0 0 0 F F F F F F
0 1 1 0 0 1 0 0 0 0 0 0 0 0 0 1 F F F F F F
0 1 1 0 1 0 0 0 0 0 0 0 0 0 0 3 F F F F F F
0 1 1 0 1 1 0 0 0 0 0 0 0 0 0 7 F F F F F F
0 1 1 1 0 0 0 0 0 0 0 0 0 0 0 F F F F F F F
0 1 1 1 0 1 0 0 0 0 0 0 0 0 1 F F F F F F F
0 1 1 1 1 0 0 0 0 0 0 0 0 0 3 F F F F F F F
0 1 1 1 1 1 0 0 0 0 0 0 0 0 7 F F F F F F F
1 0 0 0 0 0 0 0 0 0 0 0 0 0 F F F F F F F F
1 0 0 0 0 1 0 0 0 0 0 0 0 1 F F F F F F F F
1 0 0 0 1 0 0 0 0 0 0 0 0 3 F F F F F F F F
1 0 0 0 1 1 0 0 0 0 0 0 0 7 F F F F F F F F
1 0 0 1 0 0 0 0 0 0 0 0 0 F F F F F F F F F
1 0 0 1 0 1 0 0 0 0 0 0 1 F F F F F F F F F
1 0 0 1 1 0 0 0 0 0 0 0 3 F F F F F F F F F
1 0 0 1 1 1 0 0 0 0 0 0 7 F F F F F F F F F
1 0 1 0 0 0 0 0 0 0 0 0 F F F F F F F F F F
1 0 1 0 0 1 0 0 0 0 0 1 F F F F F F F F F F
1 0 1 0 1 0 0 0 0 0 0 3 F F F F F F F F F F
1 0 1 0 1 1 0 0 0 0 0 7 F F F F F F F F F F
1 0 1 1 0 0 0 0 0 0 0 F F F F F F F F F F F
1 0 1 1 0 1 0 0 0 0 1 F F F F F F F F F F F
1 0 1 1 1 0 0 0 0 0 3 F F F F F F F F F F F
1 0 1 1 1 1 0 0 0 0 7 F F F F F F F F F F F
1 1 0 0 0 0 0 0 0 0 F F F F F F F F F F F F
1 1 0 0 0 1 0 0 0 1 F F F F F F F F F F F F
1 1 0 0 1 0 0 0 0 3 F F F F F F F F F F F F
1 1 0 0 1 1 0 0 0 7 F F F F F F F F F F F F
1 1 0 1 0 0 0 0 0 F F F F F F F F F F F F F
1 1 0 1 0 1 0 0 1 F F F F F F F F F F F F F
1 1 0 1 1 0 0 0 3 F F F F F F F F F F F F F
1 1 0 1 1 1 0 0 7 F F F F F F F F F F F F F
1 1 1 0 0 0 0 0 F F F F F F F F F F F F F F
1 1 1 0 0 1 0 1 F F F F F F F F F F F F F F
1 1 1 0 1 0 0 3 F F F F F F F F F F F F F F
1 1 1 0 1 1 0 7 F F F F F F F F F F F F F F
1 1 1 1 0 0 0 F F F F F F F F F F F F F F F
1 1 1 1 0 1 1 F F F F F F F F F F F F F F F
1 1 1 1 1 0 3 F F F F F F F F F F F F F F F
1 1 1 1 1 1 7 F F F F F F F F F F F F F F F
1 1 1 1 1 1 F F F F F F F F F F F F F F F F
```

Width Mapping Table:

| W12 | W11 | W10 | Wmd in binary format | | | | | | | | |
|---|---|---|---|---|---|---|---|---|---|---|---|
| 0 | 0 | 0 | 0 | 0 | 0 | 0 | 0 | 0 | 0 | 0 | 0 |
| 0 | 0 | 1 | 0 | 0 | 0 | 0 | 0 | 0 | 0 | 0 | 1 |
| 0 | 1 | 0 | 0 | 0 | 0 | 0 | 0 | 0 | 0 | 1 | 0 |
| 0 | 1 | 1 | 0 | 0 | 0 | 0 | 0 | 0 | 1 | 0 | 0 |
| 1 | 0 | 0 | 0 | 0 | 0 | 0 | 1 | 0 | 0 | 0 | 0 |
| 1 | 0 | 1 | 0 | 0 | 1 | 0 | 0 | 0 | 0 | 0 | 0 |
| 1 | 1 | 0 | 0 | 1 | 0 | 0 | 0 | 0 | 0 | 0 | 0 |
| 1 | 1 | 1 | 1 | 0 | 0 | 0 | 0 | 0 | 0 | 0 | 0 |

(MR) multiplexer 404 is of the type which has six sets of thirty-two data inputs, which are connected, one set to (S) bus 354, another set to (A) bus 280, a third set to (Q) bus 284, and the fourth set to (DB) bus 222. The fifth set of (MR) multiplexer 404 data inputs are connected each to receive a low logic level; and the last (sixth) set of the multiplexer data inputs are connected each to receive a high logic level. Additionally, (MR) multiplexer 404 has two control (select) inputs, which are each connected to a respective line of a two line bus 470 to receive two externally generated control signals. Finally, (MR) multiplexer 404 has a set of thirty-two data outputs, which are each connected to a respective line of a thirty-two line (MR) bus 472.

Arithmetic logic unit (ALU) 406 has a set of thirty-two first operand inputs, which are each connected to the respective line of the thirty-two lines of bus 437, and a set of thirty-two second operand inputs, which are each connected to the respective line of the thirty-two lines of (S) bus 354. Additionally, arithmetic logic unit 406 has three control inputs, which are each connected to a respective line of a three line bus 380. Further, arithmetic logic unit 406 has a carry input, and three tri-state outputs that include a sign output, an overflow output, a carry output, and a cascading carry output. The later input/outputs are connected, each to a respective line of a four line bus 382. Finally, arithmetic logic unit 406 has a set of thirty-two data outputs, which are each connected to a respective line of a thirty-two line bus 438. Arithmetic logic unit 406 is of the type which executes with full carry look ahead, the following binary operations that are shown with their respective operation codes.

| Operation Code Bus 380 Signals | | | |
|---|---|---|---|
| 2 | 1 | 0 | Function |
| 0 | 0 | 0 | W + S |
| 0 | 0 | 1 | S − W |
| 0 | 1 | 0 | W − S |
| 0 | 1 | 1 | W Or S |
| 1 | 0 | 0 | W And S |
| 1 | 0 | 1 | Special Opcode (special instructions) |
| 1 | 1 | 0 | W Exor S |
| 1 | 1 | 1 | W Exnor S |

In addition, arithmetic logic unit 406 executes the following special instructions.

Special Instructions:
Bus 380 signals select the special opcode (101B)
I2I1I0 = 101B, T-sel0-1. Merge-ctr10-2:

| Bus 380 | | | Bus 200 | | Bus 352 | | | Special Instruction | Operands |
|---|---|---|---|---|---|---|---|---|---|
| 2 | 1 | 0 | 1 | 0 | 2 | 1 | 0 | | |
| 1 | 0 | 1 | 0 | 0 | 0 | 0 | 0 | Unsigned Multiply | W,S,T |
| 1 | 0 | 1 | 0 | 0 | 0 | 0 | 1 | Two's Complement Multiply | W,S,T |
| 1 | 0 | 1 | 0 | 0 | 0 | 1 | 0 | Two's Complement Multiply Last Cycle | W,S,T |
| 1 | 0 | 1 | 0 | 0 | 0 | 1 | 1 | First Divide | W,S,T |
| 1 | 0 | 1 | 0 | 0 | 1 | 0 | 0 | Second Divide | W,S,T |
| 1 | 0 | 1 | 0 | 0 | 1 | 0 | 1 | Third Divide | W,S,T |
| 1 | 0 | 1 | 0 | 0 | 1 | 1 | 0 | Prioritize 0 | S,M |
| 1 | 0 | 1 | 0 | 0 | 1 | 1 | 1 | Prioritize | S |
| 1 | 0 | 1 | 0 | 1 | 0 | 0 | 0 | S + ST | S,SP |
| 1 | 0 | 1 | 0 | 1 | 0 | 0 | 1 | S + ST* | S,SP |
| 1 | 0 | 1 | 0 | 1 | 0 | 1 | 0 | Load T, Data Load T sixteen-bit Immed. Data (see remark below) | |
| 1 | 0 | 1 | 0 | 1 | 0 | 1 | 1 | Load C1, (Z) Bus 150 | |
| 1 | 0 | 1 | 0 | 1 | 1 | 0 | 0 | Load C2, (Z) Bus 150 | |
| 1 | 0 | 1 | 0 | 1 | 1 | 0 | 1 | XCHG | DA, DB |
| 1 | 0 | 1 | 0 | 1 | 1 | 1 | 0 | Test, Bit Field Set | W,S,M |
| 1 | 0 | 1 | 0 | 1 | 1 | 1 | 1 | Test, Bit Field Clear | W,S,M |
| 1 | 0 | 1 | 1 | 0 | 0 | 0 | 0 | Signed Magn. Two's Comp. | S + CO if ZF = 0 S* + CO if ZF = 1 |
| 1 | 0 | 1 | 1 | 0 | 0 | 0 | 1 | Program Slice | |

Special Instructions:
Bus 380 signals select the special opcode (101B)
I2I1I0 = 101B, T-sel0-1. Merge-ctr10-2:

| Bus 380 | | | Bus 200 | | Bus 352 | | | Special Instruction | Operands |
|---|---|---|---|---|---|---|---|---|---|
| 2 | 1 | 0 | 1 | 0 | 2 | 1 | 0 | | |
| 1 | 0 | 1 | 1 | 0 | 0 | 1 | 0 | Unused | |
| 1 | 0 | 1 | 1 | 0 | 0 | 1 | 1 | Unused | |
| 1 | 0 | 1 | 1 | 0 | 1 | 0 | 0 | Unused | |
| 1 | 0 | 1 | 1 | 0 | 1 | 0 | 1 | Unused | |
| 1 | 0 | 1 | 1 | 0 | 1 | 1 | 0 | Unused | |
| 1 | 0 | 1 | 1 | 0 | 1 | 1 | 1 | Unused | |
| 1 | 0 | 1 | 1 | 1 | 0 | 0 | 0 | Unused | |
| 1 | 0 | 1 | 1 | 1 | 0 | 0 | 1 | Unused | |
| 1 | 0 | 1 | 1 | 1 | 0 | 1 | 0 | Unused | |
| 1 | 0 | 1 | 1 | 1 | 0 | 1 | 1 | Unused | |
| 1 | 0 | 1 | 1 | 1 | 1 | 0 | 0 | Unused | |
| 1 | 0 | 1 | 1 | 1 | 1 | 0 | 1 | Unused | |
| 1 | 0 | 1 | 1 | 1 | 1 | 1 | 0 | Unused | |
| 1 | 0 | 1 | 1 | 1 | 1 | 1 | 1 | Unused | |

Remark: The load T sixteen-bit immediate data instruction (10101010) is used to load sixteen bits of immediate data into the least significant sixteen bits of the seven-port random access memory unit 128 location which is specified by the bus 252 signals, whereby the most significant sixteen bits of the seven-port random access memory unit 128 location are unmodified. To load thirty-two bits of immediate data into the seven-port random access memory unit 128 location requires the following three instructions.

| 1 | Load | T, Sixteen Bits of Immediate Data |
| 2 | Shiftup | T, Sixteen Positions |
| 3 | Load | T, Sixteen Bits of Immediate Data |

The sign/magnitude two's complement instruction is used to convert a number between two's complement and sign/magnitude representation.

Merge logic unit 408 has a set of thirty-two data inputs, each of which is connected to the respective line of the thirty-two lines of the 438, a set of thirty-two data/control inputs, each of which is connected to the respective line of the thirty-two lines of (M) bus 350, and another set of thirty-two data inputs, each of which is connected to the respective line of the thirty-two lines of (MR) bus 472. Further, merge logic unit 408 has a set of three control (select) inputs, each of which is connected to the respective line of the three lines of bus 452, and a set of thirty-two data outputs, each of which is connected to a respective line of a thirty-two line bus 502.

Employed in merge logic unit 408 (but not shown) are thirty-two multiplexers, each of which has a special control portion. The multiplexers are each of the type which has a (single) data input, that is connected to the respective line of the thirty-two lines of (M) bus 350, a (single) data/control input, that is connected to the respective line of the thirty-two lines of (M) bus 350, another (single) data input, that is connected to the respective line of the thirty-two lines of (MR) bus 472, three control (select) inputs, that are each connected to the respective line of the three lines of bus 452, and a (single) data output, that is connected to the respective line of the thirty-two lines of bus 502. In a merge mode (selected by signals developed on bus 452), each of the multiplexers develops on the respective line of bus 502 a signal the state of which corresponds either to the state of a signal developed on the respective line of the 438 or to the state of a signal developed on the respective line of (MR) bus 472, as determined (selected) by the state of a signal developed on the respective line of (M) bus 350. In a pass through mode, each of the multiplexers develops the respective bus 502 signal so as to have a state which corresponds either to the state of the bus 438, to the state of the (M) bus 350 signal, or to the state of the (MR) bus 472 signal, as determined (selected) by the state of the bus 452 signals.

The state of the (M) bus 350 signals are illustrated by the following truth table.

| Mask selection: | | |
|---|---|---|
| Bus 452 Signals | | |
| 1 | 0 | Selection |
| 0 | 0 | (SP) Bus 242, (W) Bus 244 (start position, width) |
| 0 | 1 | (T) Bus 180, (Q) Bus 284 (start position, width) |
| 1 | 0 | (T) Bus 180 (as thirty-two bit mask) |
| 1 | 1 | (Q) Bus 284 (as thirty-two bit mask) |

The state of the bus 502 signals are illustrated by the following truth table.

| Merge control: | | | |
|---|---|---|---|
| Bus 452 Signals | | | |
| 2 | 1 | 0 | Merge Function |
| 0 | 0 | 0 | Read Out the State of the (F) Bus 438 Signals |
| 0 | 0 | 1 | Read Out the State of the (M) Bus 350 Signals |
| 0 | 1 | 0 | Merge With the State of the (S) Bus 354 Signals |
| 0 | 1 | 1 | Merge With the State of the (Q) Bus 284 Signals |
| 1 | 0 | 0 | Merge With the State of the (A) Bus 280 Signals |
| 1 | 0 | 1 | Merge With the State of the (DB) Bus 222 Signals |
| 1 | 1 | 0 | Merge With 00000000H |
| 1 | 1 | 1 | Merge With FFFFFFFFH |

Both multiplexers 410 and multiplexer 414 are of the type which is similar to (C) multiplexer 114. One set of the data inputs of each of the multiplexers (410 and 414) is connected to bus 438; and, the other set of the data inputs is connected to (R) bus 240. The control (select) input of multiplexer 410 is connected to a line 522; and, the control input of multiplexer 414 is connected to a line 524. Finally, the set of data outputs of multiplexer 410 is connected to (Z) bus 150; and, the set of data outputs of multiplexer 414 is connected to a thirty-two line bus 526.

Zero detector 412 has a set of thirty-two data inputs, each of which is connected to the respective line of bus 526, and a data output, which is connected to a line 530. Zero detector 412 is of the type which develops on line 530 a signal having a high logic level when (and only when) each of the signals developed on bus 526 has a low logic level (zero).

Priority encoder 416 has a set of thirty-two data inputs, which are each connected to the respective one of the thirty-two lines of bus 502, and a set of six data outputs, each of which is connected to a respective line of the six lowest order lines of a thirty-two line bus 540. Priority encoder 416 is of the type which develops on the six lowest order lines of bus 540 signals, the state of which indicates the highest order input bit which is a one (the highest order line of bus 502 upon which a signal is developed that has a high logic level), as is indicated by the following truth table.

| Highest Priority Active Bit | Encoder Output |
|---|---|
| None | 0 |
| 32 | 1 |
| 31 | 2 |
| 30 | 3 |
| 29 | 4 |
| 28 | 5 |
| 27 | 6 |
| 26 | 7 |
| 25 | 8 |
| 24 | 9 |
| 23 | 10 |
| 22 | 11 |
| 21 | 12 |
| 20 | 13 |
| 19 | 14 |
| 18 | 15 |
| 17 | 16 |
| 16 | 17 |
| 15 | 18 |
| 14 | 19 |
| 13 | 20 |
| 12 | 21 |
| 11 | 22 |
| 10 | 23 |
| 9 | 24 |
| 8 | 25 |
| 7 | 26 |
| 6 | 27 |
| 5 | 28 |
| 4 | 29 |
| 3 | 30 |
| 2 | 31 |
| 1 | 32 |
| 0 | 33 |

Multiplexer 418, which is similar to (C) multiplexer 114, is configured with one set of the data inputs connected to bus 502, with the other set of the data inputs connected to bus 540, with the control (select) input connected to a line 550, and with the set of data outputs connected to (R) bus 240.

Additionally, bit-slice 100 includes serial diagnostic circuitry of the type which is disclosed in the U.S. patent application Ser. No. 888,701 of Michael J. Miller, which was filed on July 24, 1986.

It is contemplated that after having read the preceding disclosure, certain alterations and modifications of the present invention will no doubt become apparent to those skilled in the art. It is therefore intended that the following claims be interpreted to cover all such alterations and modifications as fall within the true spirit and scope of the invention.

What is claimed is:

1. A thirty-two bit, cascadable, microprogrammable, bit-slice comprising in combination:
   a DA bus;
   a Z bus;
   a DB bus;
   an A multiplexer including a first set of data inputs connected to said DA bus, a second set of data inputs connected to said Z bus, a third set of data inputs connected to said DB bus, and a set of data outputs;
   an R bus;
   a T multiplexer including a first set of data inputs connected to said Z bus, a second set of data inputs connected to said R bus, and a set of data outputs;
   a B multiplexer including a first set of data inputs connected to said DA bus, a second set of data inputs connected to said Z bus, a third set of data inputs connected to said DB bus, and a set of data outputs;

a random access memory unit including an A set of data inputs connected to said A multiplexer set of data outputs, a T set of data inputs connected to said T multiplexer set of data outputs, a B set of data inputs connected to said B multiplexer set of data outputs, an A, a T, a Q, and a B set of address inputs, and an A, a T, a Q, and a B set of data outputs, said random access memory unit being responsive to an A address represented by signals externally developed at said A set of address inputs and operative to store at said A address a number represented by signals developed at said A set of data inputs and to develop at said A set of data outputs signals representing the number stored at said A address, responsive to a T address represented by signals externally developed at said T set of address inputs and operative to store at said T address a number represented by signals developed at said T set of data inputs and to develop at said T set of data outputs signals representing the number stored at said T address, responsive to a Q address represented by signals externally developed at said Q set of address inputs and operative to develop at said Q set of data outputs signals representing a number stored at said Q address, and responsive to a B address represented by signals externally developed at said B set of address inputs and operative to store at said B address a number represented by signals developed at said B set of data inputs and to develop at said B set of data outputs signals representing the number stored at said B address;

an A bus coupled to said random access memory unit A set of data outputs;

a T bus coupled to said random access memory unit T set of data outputs;

a Q bus coupled to said random access memory unit Q set of data outputs;

a B bus coupled to said random access memory unit B set of data outputs;

an X multiplexer including a first set of data inputs connected to said DA bus, a second set of data inputs connected to said A bus, a third set of data inputs connected to said T bus, and a set of data outputs;

a S multiplexer including a first set of data inputs connected to said A bus, a second set of data inputs connected to said T bus, a third set of data inputs connected to said Q bus, a fourth set of data inputs connected to said B bus, and a set of data outputs;

a Y multiplexer including a first set of data inputs connected to said Q bus, a second set of data inputs connected to said B bus, a third set of data inputs connected to said DB bus, and a set of data outputs;

an X bus connected to said X multiplexer set of data outputs;

an S bus connected to said S multiplexer set of data outputs;

a Y bus connected to said Y multiplexer set of data outputs;

a funnel shifter including an X set of operand inputs connected to said X bus, a Y set of operand inputs connected to said Y bus, and a set of data outputs;

a W bus connected to said funnel shifter set of data outputs;

a mask generator including a first set of start position inputs connected to said T bus, a first set of width inputs connected to said Q bus, and a set of outputs;

an M bus connected to said mask generator set of outputs;

an MR multiplexer including a first set of data inputs connected to said S bus and a set of data outputs;

an MR bus connected to said MR multiplexer set of data outputs;

an arithmetic logic unit including a set of first operand inputs connected to said W bus, a set of second operand inputs connected to said S bus, and a set of data outputs;

an F bus connected to said arithmetic logic unit set of data outputs;

a merge logic unit including a first set of data inputs connected to said F bus, a set of data/control inputs connected to said M bus, a second set of data inputs connected to said MR bus, and a set of data outputs;

first coupling means coupling said merge logic unit set of data outputs to said R bus; and a Z multiplexer including a first set of data inputs connected to said F bus, a second set of data inputs connected to said R bus, and a set of data outputs connected to said Z bus.

2. A thirty-two bit, cascadable, microprogrammable, bit-slice as recited in claim 1 wherein said T multiplexer further includes a third set of data inputs and wherein said thirty-two bits, cascadable, microprogrammable, bit-slice further comprises a C1 register including a set of data inputs connected to said Z bus and a set of data outputs and second coupling means coupling said C1 register data outputs to said T multiplexer third set of data inputs.

3. A thirty-two bit, cascadable, microprogrammable, bit-slice as recited in claim 2 wherein said second coupling means includes a C multiplexer having a first set of data inputs connected to said C1 register data outputs, a second set of data inputs, and a set of data outputs and an adder having a set of first addend inputs connected to said C multiplexer data outputs, a second set of addend inputs connected to said T bus, and a set of sum outputs connected to said T multiplexer third set of data inputs and wherein said thirty-two bit, cascadable, microprogrammable, bit-slice further comprises a C2 register including a set of data inputs connected to said Z bus and a set of data outputs connected to said C multiplexer second set of data inputs.

4. A thirty-two bit, cascadable, microprogrammable, bit-slice as recited in claim 1 wherein said S multiplexer further includes a fifth set of data inputs connected to said DA bus, a sixth set of data inputs connected to said DB bus, a seventh set of data inputs connected to said R bus, and an eighth set of data inputs connected to said M bus.

5. A thirty-two bit, cascadable, microprogrammable, bit-slice as recited in claim 1 wherein the MR multiplexer further includes a second set of data inputs connected to said A bus, a third set of data inputs connected to said Q bus, and a fourth set of data inputs connected to said DB bus.

6. A thirty-two bit, cascadable, microprogrammable, bit-slice as recited in claim 1 wherein said first coupling means includes a priority encoder having a set of data inputs connected to said merge logic unit set of data outputs and a set of data outputs and a multiplexer including a first set of data inputs connected to said merge logic unit set of data outputs, a second set of data inputs connected to said priority encoder set of data outputs, and a set of data outputs connected to said R bus.

7. A thirty-two bit, cascadable, microprogrammable, bit-slice as recited in claim 1 further comprising a zero detector including a set of data inputs and a data output and a multiplexer including a first set of data inputs connected to said F bus, a second set of data inputs connected to said R bus, and a set of data outputs connected to said zero detector set of data inputs.

8. A thirty-two bit, cascadable, microprogrammable, bit-slice as recited in claim 1 wherein said T bus includes a number of lines and wherein said T multiplexer further includes a third set of data inputs each connected to one of said T bus lines such that a number represented by signals developed on said T bus lines appears at said T multiplexer third set of data inputs as though the number had been multiplied by a factor of two and a fourth set of data inputs each connected to one of said T bus lines such that the number appears at said T multiplexer third set of data inputs as though the number had been divided by a factor of two.

* * * * *